United States Patent [19]

Rodriquez-Kabana et al.

[11] Patent Number: 5,057,141
[45] Date of Patent: Oct. 15, 1991

[54] COMPOSITIONS FOR BIOLOGICAL CONTROL OF PLANT PATHOGENIC NEMATODES

[75] Inventors: R. Rodriquez-Kabana, Auburn, Ala.; Robert A. Milch, Baltimore, Md.

[73] Assignee: Igene Biotechnology Inc., Columbia, Md.

[21] Appl. No.: 226,904

[22] Filed: Aug. 1, 1988

Related U.S. Application Data

[63] Continuation-in-part of Ser. No. 84,061, Aug. 11, 1987, abandoned.

[51] Int. Cl.$^5$ ............... C05C 9/00; C05F 11/00
[52] U.S. Cl. ............... 71/28; 71/5; 71/16; 71/26; 71/29; 71/64.11; 71/88; 71/903; 71/904; 435/243; 424/195.1
[58] Field of Search ............... 71/5, 16, 28, 29, 26, 71/64.11, 903, 904, 88; 435/243; 424/195.1

[56] References Cited

U.S. PATENT DOCUMENTS

| Re. 22,202 | 10/1942 | Stoller | 71/5 |
|---|---|---|---|
| 434,243 | 8/1890 | Carlile et al. | |
| 2,260,201 | 10/1941 | Stoller | 71/5 |
| 2,827,368 | 3/1958 | Mortenson | 71/29 |
| 3,249,441 | 5/1966 | Reynolds et al. | 71/28 X |
| 3,558,299 | 1/1971 | Baskin | 71/28 |
| 3,660,571 | 5/1972 | Kodama et al. | 424/181 |
| 4,283,219 | 8/1981 | Wagner et al. | 71/28 |
| 4,401,762 | 8/1983 | Tellier et al. | 435/243 |
| 4,414,333 | 11/1983 | Olivieri et al. | 435/243 |
| 4,442,092 | 4/1974 | McBrayer | 424/195.1 |
| 4,460,692 | 7/1984 | Tellier et al. | 435/243 |
| 4,536,207 | 8/1985 | McCandliss et al. | 71/88 |
| 4,539,038 | 9/1985 | Gombert | 71/64.11 |

OTHER PUBLICATIONS

R. Rodriguez-Kabana, J. Nematol. 18:129-135 (1986).
R. Rodriguez-Kabana, G. Morgan-Jones + I. Chet, Plant and Soil, 100:237-247 (1987).
J. T. Walker, J. Nematology, 3:43-49 (1971).
J. T. Walker, J. Nematology, 1:260-264 (1969).
Huebner, Dissertation: Hemicellulosic Waste and Urea for Control of Plant Parasitic Nematodes, Order No. DA 8212687, Auburn University (1982).
Chemistry Abstracts, 97:67774b.
J. Walker et al., Plant Disease Reporter, vol. 51, No. 12, pp. 1021-1024 (Dec. 1987).
R. Rodriguez-Kabana et al., Abstract at p. 76 of Program of Society of Nematologists, (Jun. 12-16, 1988).
Speigel et al., Plant and Soil, 98:337-345 (1987).

*Primary Examiner*—Ferris H. Lander
*Attorney, Agent, or Firm*—Sughrue, Mion, Zinn, Macpeak & Seas

[57] ABSTRACT

Soybean meal and urea compositions have been found to exhibit enhanced and commercially useful nematistatic and nematicidal activity in soils. Chitin-containing materials, e.g., crab shells, shrimp shells, fungal mycella, etc., have also been found to exhibit enhanced and commercially useful nematistatic and nematicidal activity in soils when admixed with other organic nitrogen-containing materials such as ammonium phosphates, a source of urea, and plant, fish or animal meal. Also, compositions formulated of two different chitin source materials can be used. The soybean-urea compositions as well as the blended chitin-containing formulations are non-phytotoxic and simultaneously provide cost-effective biological suppression of plant pathogenic nematode populations and excellent plant nutrition.

18 Claims, 9 Drawing Sheets

COMPOSITIONS FOR BIOLOGICAL CONTROL OF PLANT PATHOGENIC NEMATODES

This application is a continuation-in-part application of U.S. Ser. No. 07/084061, filed Aug. 11, 1987 and now abandoned.

FIELD OF THE INVENTION

This invention relates to methods for optimizing the functional properties and use of compositions of organic matter for the biological control of plant pathogens in soils. More particularly, the invention relates to unconventional methods for using specific organic nitrogen and organic carbon materials to formulate optimized and cost-effective soil amendments which have a low carbon:nitrogen (C:N) ratio and a high Kjeldahl "protein" content, are not phytotoxic, and render plant-pathogenic nematodes and/or their eggs susceptible to destruction by native soil microorganisms and thus act indirectly as biological control agents to suppress nematode populations in soils.

This invention also relates to methods for optimizing the functional properties and use of compositions of matter that are obtained from shellfish and industrial fermentation wastes and for avoiding costly traditional methods for disposing of low economic value, foul smelling and polluting byproducts of the shellfish processing and fermentation chemical industries. One aspect of the invention relates to methods for using a chitin-protein complex that can be isolated from fungal mycelia or by acid demineralization from the tough polymer matrix of crustacean exoskeletons and similar chitinous substances in combination with specific organic nitrogen and organic carbon materials to formulate optimized and cost-effective soil amendments which have an unusually low carbon:nitrogen (C:N) ratio, are not phytotoxic, and render nematodes or their eggs susceptible to destruction by native soil microorganisms and thus indirectly suppress nematode populations in soils. Other aspects of the invention relate to use of combinations of chitinous materials, and to use of combinations of non-chitinous materials to suppress soil nematodes.

BACKGROUND OF THE INVENTION

Nematodes (nema—threads; oides—resembling) are unsegmented roundworms with elongated, fusiform or saclike bodies covered with cuticle which belong to the phylum Nemathelminthes and are virtually ubiquitous in nature, inhabiting soil, water and plants. The effects of what are now known as plant-pathogenic species of nematodes have been recognized since biblical times and continue to be major causes of crop losses worldwide. In 1982, by way of example, crop losses due to nematodes in the U.S. alone were estimated to exceed $5 billion, reflecting losses in farm production of 42 million tons of field crops, 5 million tons of vegetable and melon crops and 4 million tons of fruit and nut crops. Nematodes were also estimated to cause 10 percent or more losses in the economic value of floral crops, lawns and turf, and ornamentals.

Man has added organic and inorganic amendments to soil for centuries to improve soil fertility and increase crop yield. The nematicidal effects of some of these amendments have been recognized for some time and reviews on the subject have been published; e.g., R. Rodriguez-Kabana, *J. Nematol.* 18:129-135 (1986) and R. Rodriguez-Kabana, G. Morgan-Jones and I. Chet, Plant and Soil, 100:237-247 (1987), the contents of which are incorporated by reference herein. Particularly noteworthy is page 239 of this article, which discloses that organic soil amendments are nematicidal when the C:N ratio is less than 20, but the amendments are phytotoxic when the C:N ratio drops below 11.

While most nematicidal soil amendments are oilcakes and meals or manures and composts, it has also been found that some organic nitrogenous amendments, especially those with low carbon:nitrogen (C:N) ratios and high "protein" contents as measured by Kjeldahl nitrogen methods, act when added in quantity to soils as if they were toxins for nematodes. Most interesting among these organic nitrogenous amendments for control of plant-pathogenic soil nematodes are materials which contain ammoniacal nitrogen, such as urea (e.g., see J. T. Walker, *J. Nematology*, 3:43-49 (1971)) and materials which contain chitin and related mucopolysaccharides (e.g., see M. B. Linford, F. Yap and J. M. Oliviera, *Soil Science*, 45:127-141 (1938); R. Mitchell and M. Alexander, *Plant Dis. Reporter*, 45:487 (July 15, 1961); Soil Sc. Soc., 26:556-558 (1962); I. H. Mian, G. Godoy, R. A. Shelby, R. Rodriguez-Kabana and G. Morgan-Jones, *Nematropica* 12:71-84 (1982); G. Godoy, R. Rodriguez-Kabana, R. A. Shelby and G. Morgan-Jones, *Nematropica* 13:63-74 (1983); R. Rodriguez-Kabana, G. Morgan-Jones and B. Ownley Gintis, *Nematropica*, 14:10-25 (1984) and A. K. Culbreath, R. Rodriguez-Kabana and G. Morgan-Jones, *Nematropica*, 16:153-166 (1986). See also McCandliss, Eastwood and Milch, U.S. Pat. No. 4,536,207). J. T. Walker, *J. Nematology*, 1:260-264 (1969) studied the nematicidal effects of soil amendments with soybean meal and of soil amendments with urea, but this reference does not discuss soil amendments with both urea and soybean meal.

Urea has been demonstrated to be a good nematicide at high application rates (e.g., $\geq 300$ mg N/kg soil) but it is also phytotoxic at these levels owing to its low C:N ratio. Detrimental effects of high soil concentrations of urea can be overcome, however, by supplementing urea amendments with additional available carbon required to ensure adequate stimulation in soils of microbial metabolic activity (See, for example: Huebner Dissertation: Hemicellulosic Waste and Urea for Control of Plant Parasitic Nematodes, Order No. DA8212687, Auburn University (1982), *Chemistry Abstracts*, 97:67774b; R. Rodriguez-Kabana and P. S. King, *Nematropica*, 10:38-44 (1980); and R. A. Huebner, R. Rodriguez-Kabana and R. M. Patterson, *Nematropica*, 13:37-54 (1983).

It is known to prepare a fertilizer by combining urea with soybean meal (see, e.g., Keyssner et. al., U.S. Pat. No. 1,857,914 and Baskin, U.S. Pat. No. 3,558,299), Mortenson et. al., U.S. Pat. No. 2,827,368 mention soybean meal and urea as fertilizers but does not mention combining the two. Stoller, U.S. Pat. No. re.22,202 lists both soybean meal and urea as examples of nitrogen sources for a compost for mushroom culture, but Stoller does not teach the combination of the two. Reynolds et. al., U.S. Pat. No. 3,249,441 utilizes a soybean meal and urea combination for animal feed. Other agriculturally derived ingredients have been combined with urea as fertilizer or for other culturing compositions (see, e.g., Stoller, U.S. Pat. No. 2,260,201 (with cottonseed meal for mushroom culture) Tellier et. al., U.S. Pat. No. 4,401,762 (with corn cob extract for culturing microorganisms); Tellier et al, U.S. Pat. No. 4,460,692 (with corn cob extract for culturing microorganisms). Wagner et al, U.S. Pat. No. 4,283,219 combines fish-meal or bone-meal with urea for fertilizer. Soy lecithin has been combined with urea for use in depolluting water through microbial action (Olivieri et al, U.S. Pat. No. 4,414,333).

Soybean meal compositions have been disclosed for use in the control of nematodes, but these references do not teach the use of urea in combination with soybean meal (see. e.g. Walker, supra; Kodama et al U.S. Pat. No. 3,660,571; McBrayer. U.S. Pat. No. 4,442,092 (sesame meal instead of soybean meal); Carlile et al, U.S. Pat. No. 434,243 (cottonseed meal instead of soybean meal; control of insects and cut-worm instead of nematodes); McCandliss et al, U.S. Pat. No. 4,536,207 (shellfish waste instead of soybean meal)).

As ancillary background information, it should be noted that until quite recently the high cost of producing chitin and chitin derivatives in commercial quantities has effectively eliminated any practical or commercial uses of the polymer in either horticulture or agriculture. McCandliss et al., U.S. Pat. No. 4,536,207, issued Aug. 20, 1985, describes a low cost process for manufacturing a chitin-protein complex with demonstrable nematistatic and nematicidal activity, marketed by IGENE Biotechnology, Inc. of Columbia, Md. under the registered trademark ClandoSanR ®, which provides a commercially useful chitin product for application in both horticulture and agriculture. As with other nitrogenous soil amendments, chitin soil amendments have also been found to be phytotoxic at high concentrations.

Finally, it should be noted that increasing governmental restrictions, both in the United States and abroad, against the use of highly effective but environmentally hazardous and toxic synthetic agrichemicals, such as ethylene dibromide (EDB), dibromochloropropane (DBCP) and possibly other halogenated hydrocarbon compounds as well as numerous carbamates and organophosphates, demonstrate the need for active compositions and formulations of matter which have significant nematicidal effects against commercially important plant-pathogenic nematodes, avoid phytotoxic effects and provide excellent plant nutrition at cost and price structures which make the products competitive with currently used synthetic pesticides. The present invention fills such a need.

SUMMARY OF THE INVENTION

The present invention relates to compositions and formulations of matter which are useful suppressants of plant-pathogenic nematode populations when added to plant growth media, and to methods for the use thereof.

It is a general object of this invention to provide compositions of matter which are obtained from organic sources and stimulate the reproduction and development in soil of normal microflora which produce ammonia and enzymes that are parasitic or destructive to plant-pathogenic nematodes of agricultural and horticultural importance.

Another object of the invention is to provide such compositions further comprising compounds which are effective in rendering nematodes and/or their eggs susceptible to attack by such microflora.

A more particular object of the invention is to provide inexpensive compositions of matter which have significant nematicidal activity but are non-toxic to plants, animals and man, and can replace environmentally hazardous and toxic synthetic agrichemicals in commercial applications.

Still another object of this invention is to provide nematicidally active compositions of matter which also stimulate the growth of plants in nematode-infested soils.

Yet another object of this invention is to provide compositions and methods for imparting sustained nematicidal and fertilizer activity to soils.

A further object of this invention is to provide a method for reclaiming and managing nematode-infested lands for agricultural, horticultural or forestry use.

One embodiment of the present invention involves the discovery that nematicidally active compositions and formulations of matter can be obtained by admixing soybean meal and a source of urea, either alone or in combination with certain organic nitrogen and carbon containing industrial waste materials, such as fungal mycelial wastes remaining after commercial fermentation processes and dried crustacean shell wastes remaining after commercial seafood processing operations, or in combination with organic phosphorus materials, such as ammonium phosphates, to produce soil amendments which have desirable C:N ratios and protein contents for stimulating the reproduction and development of normal soil microflora which are antagonistic to plant-pathogenic nematodes in soils and at the same time provide non-phytotoxic, at times clear fertilizer, effects.

The above and other objects, features and advantages of this invention are obtained in one aspect thereof by providing a soil amendment and fertilizer composition capable of stimulating the reproduction and development of normal soil microflora which are antagonistic to plant-pathogenic nematodes of selected crop plants, which comprises an admixture comprising:

a. a source of ammoniacal nitrogen in a concentration and amount effective to suppress the growth of plant-pathogenic nematodes damaging to said crop plants but which by itself would often be phytotoxic to said selected crop plants; and b. a source of soybean meal in a concentration and amount effective in combination with component a to suppress the growth of plant-pathogenic nematodes damaging to said crop plants while alleviating the phytotoxic effects of component a;

wherein the ratio of components a and b is effective to substantially eliminate whatever level of phytotoxicity exists in each component for the selected crop plant.

Another object of the invention is to provide inexpensive wholly or partly demineralized chitin-containing compositions of matter which have improved nematicidal activity but are non-toxic to plants, animals and man, and can replace environmentally hazardous synthetic agrichemicals in commercial applications.

Still another object of this invention is to provide an industrially useful and ecologically sound method for disposing of the chitin-containing wastes of the fishing and fermentation industries.

An additional object of this invention is to provide a method for economically disposing of crab, crayfish and other crustacean shell wastes remaining after commercial processing operations and of fungal mycelial waste products of industrial fermentation processes.

Yet another object of this invention is to provide compositions and methods for imparting sustained nematicidal activity to soils which persists beyond a single planting cycle.

With regard to certain of the above objects of the invention, in addition to all the other above-stated objects the present invention in part involves the discovery that a nematicidally active chitin-protein complex that is easily and economically prepared from crustacean shell wastes and from fungal mycelial residues of industrial fermentations can be combined with other organic nitrogen and carbon materials, specifically urea and soybean meal or other plant meals, to produce soil amendments which have desirable C:N ratios for stimulating the reproduction and development of soil microflora that are antagonistic (i.e., parasitic or destructive) to nematodes in soils and which at the same time provide clear fertilizer effects.

Because of the enhanced nematicidal activity and fertilizer effect that is induced by combining other nitrogenous materials with the nematicidally active chitin-protein complex described by McCandliss, Eastwood and Milch (e.g., U.S. Pat. No. 4,536,207), addition to soils of the compositions of matter described herein, provides an economically and environmentally attractive means for reducing food, fiber and economic losses due to nematode infestations and a means for the use of otherwise low value and polluting shellfish wastes.

Certain of the above objects, as well as other objects, features and advantages of this invention, are obtained in one aspect thereof by providing a soil amendment and at times fertilizer composition capable of stimulating the reproduction and development of normal soil microflora which are antagonistic to plant pathogenic nematodes of selected crop plants, which comprises an admixture comprising:

a. a source of polymeric N-acetyl-D-glucosamine in a concentration and amount effective to suppress the growth of plant-pathogenic nematodes damaging to said crop plants; and b. a source of ammoniacal nitrogen in a concentration and amount effective to suppress the growth of plant-pathogenic nematodes damaging to said crop plants but which by itself would often be phytotoxic to said selected crop plants;

wherein the ratio of components a and b is effective to substantially eliminate whatever level of phytotoxicity exists in each component for the selected crop plant.

Thus, the present invention covers three sub-generic categories of nematicidal or nematistatic compositions: (A) soybean meal-urea compositions, which can optionally further comprise chitin compositions and (B) combinations of chitin-containing compositions, which can optionally further comprise soybean meal and/or urea compositions and (C) chitin-containing/urea compositions which can optionally further comprise soybean meal.

Upon study of the specification and appended claims, further objects, features and advantages of this invention will become more fully apparent to those skilled in the art to which this invention applies.

The above and other objects, features and advantages of the present invention will be more fully appreciated by those of ordinary skill in the art to which the invention pertains from the following detailed discussion and annexed drawings, wherein:

DETAILED DESCRIPTION OF THE INVENTION

Figure 1:
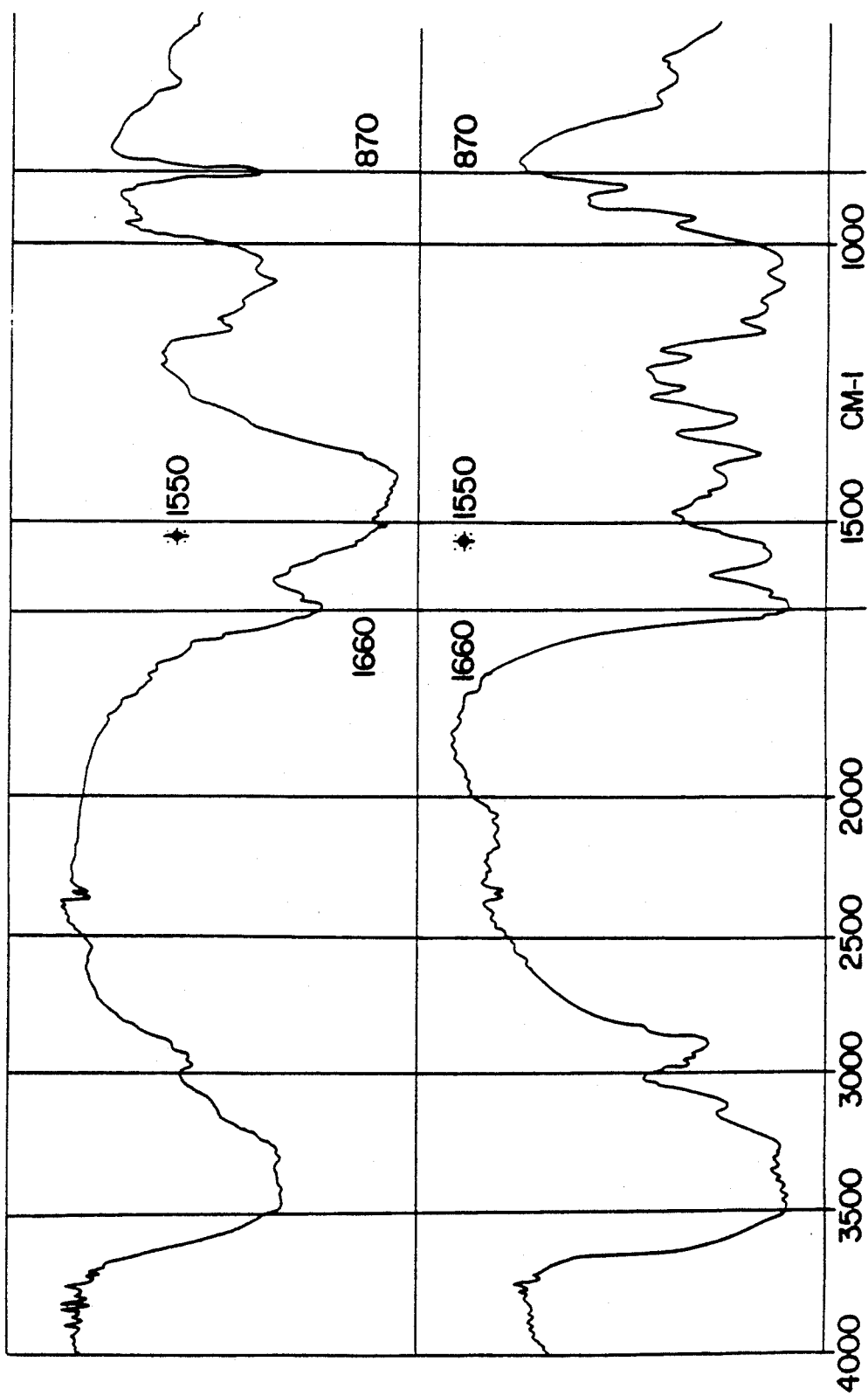
FIG. 1 is typical infrared spectra of the demealed crustacean shell (ClandoSan ® 601) usable in the practice of certain embodiments of this invention and of a commercial source of chitin.

All percentages and ratios herein are by weight unless otherwise stated.

A wide variety of plant pathogenic nematodes can be controlled in accordance with the present invention. Such nematodes can be endoparasitic and include but are not limited to those selected from the group consisting of root-knot nematodes of the Meloidogyne genus, root-lesion nematodes of the Pratylenchus genus, cyst-forming nematodes of the Heterodera or Globodera genus, citrus nematodes of the Tylenchulus genus, reniform nematodes of the Rotylenchulus genus, and burrowing nematodes of the Radopholus genus. The plant pathogenic nematode can be ectoparasitic, including but not limited to those selected from the group consisting of dagger nematodes of the Xiphinema genus, stubby-root nematodes of the Trichodorus genus, spiral nematodes of the Rotylenchus or Helicotylenchus genus, sting nematodes of the Belonolaimus genus, and pin nematodes of the Paratylenchus genus. Alternatively, the plant pathogenic nematode can include one or more genus selected from the group consisting of leaf nematodes of the Aphelenchoides genus and bulb and stem nematodes of the Dutylenchus genus.

A. The Chitin-Containing Compositions

The chitin-containing compositions of this invention can be prepared as set forth hereinafter.

The source of N-acetyl-D-glucosamine includes but is not limited to chitin or a chitin-protein complex derived from arthropod exoskeleton shells, especially those wherein the arthropod is a chelicerata or a mandibulata. Alternatively, the source of N-acetyl-D-glucosamine is chitin or a chitin-protein complex derived from a microorganism containing said glucosamine especially a microorganism which is a waste product from an industrial fermentation process; preferably, such a microorganism is a filamentous fungus and the source of said glucosamine is its mycelium, especially when the microorganism is one from a citric acid or antibiotic-producing fermentation process. Furthermore, the source of said glucosamine can be a mixture of glucosamine-containing materials from both arthropod and microorganism sources, preferably from sources wherein the arthropod is a crustacean and the microorganism is a filamentous fungus. Especially preferred are those compositions wherein source of said glucosamine is a chitin-protein complex, particularly one obtained by demineralization of crustacean shells. As described in Example 3 hereinbelow in one embodiment of this invention, mixtures of chitinous materials are employed which contain neither soybean meal nor urea.

While the ammoniacal nitrogen can be provided by ammonia itself when used, it is preferable to use a more sustained or slow release source, e.g. a source of urea, which can be formulated by means known in the art. Other sources of ammoniacal nitrogen which can be employed in accordance with the chitin-containing compositions of the present invention include ammonium phosphates and organic sources, e.g., soybean meal, cottonseed meal, sunflower seed meal, linseed meal, peanut meal, safflower meal, fish meal, corn gluten meal dehydrated or sun-cured alfalfa, crustacean meals, etc. Of these, soybean meal is presently preferred.

In the chitin-containing urea compositions of this invention, the ratio by weight of chitin-protein complex to urea provided by a source thereof is about 5:1 to 1.5:1, preferably about 3:1 to 2:1. The total C:N ratio of the chitin-containing urea composition is below about 6, preferably below about 4 with a nitrogen content of about 7 to 17% preferably about 9 to 13%. corresponding to a Kjeldahl protein of about 43.75 to 106.25%, preferably above 70% and most preferably about 56.25 to 81.25%. Ash content is usually about 19 to 30%. The actual amounts in weight of chitin-protein complex and urea or source of urea material in the chitin/urea compositions of this invention are such to provide in practice about 1.0 to 3.0 grams of the chitin/urea composition per kilogram of soil in which said composition is admixed. These application values roughly translate to about 1.0 to 3.0 tons of the chitin/urea composition per treated acre (in either a broadcasted or banded basis) based on admixture to a depth of about 6 inches.

In the compositions of this invention wherein only combinations of chitinous materials are employed, the total C:N ratio is below about 6 with a nitrogen content of about 5 to 6%, corresponding to a Kjeldahl protein of about 31.25 to 37.5%. The actual amounts in weight of chitin materials in the exclusively chitin-containing compositions of this invention are such to provide in practice about 1 to 3 grams of chitin materials per kilogram of soil in which said composition is admixed. These application values roughly translate to about 1 to 3 tons of chitin material per treated acre based (on either a broadcasted or banded basis) on admixture to a depth of about 6 inches. In these compositions ratios of, for example, demealed shell and demineralized shell, can be about 1:3 to 3:1 to provide a chitin material containing about 55 to 70% chitin-protein complex.

In one aspect, the compositions of the present invention further comprise a source of dibasic ammonium phosphate in a concentration and amount effective to further suppress the growth of plant-pathogenic nematodes and to further reduce the phytotoxicity of the composition to the selected crop plant.

In an especially preferred embodiment, the chitin-containing compositions further comprise a source of carbon atoms metabolizable by said microflora in a concentration and amount effective to further suppress the growth of the plant-pathogenic nematodes and to further reduce the phytotoxicity of the composition to the selected crop plant. Especially preferred are chitin-containing compositions which also provide additional ammoniacal nitrogen, e.g., meals such as soybean meal, cottonseed meal, sunflower seed meal, linseed meal, peanut meal, safflower meal, fish meal, corn gluten meal, jojoba meal, sesame meal, dried citrus pulp, dehydrated or sun-cured alfalfa. Of these soybean meal is presently preferred and should be used in an amount (by weight) at least equal to the primary source of ammoniacal nitrogen preferably at least twice as much, most preferably about four times as much, based on the urea equivalent thereof; maximum amounts are limited by toxicity considerations so that generally ten times the amount of urea will be the maximum employed. This is in sharp contradistinction to the prior art belief that high C:N ratios should be used. In this preferred embodiment, using chitin-protein complex—urea—soybean meal as an example, the proportion of chitin-protein complex to urea to meal is about 1.5 to 3.5 parts chitin-protein complex and about 3.0 to 5.0 parts meal, each to about 1.0 part urea. Most preferably, the ratio of chitin-protein complex:urea:soybean meal is about 2.5:1:4.0 as found in ClandoSan ® 618.

As can be seen from the carbon/nitrogen analysis in Table 1, the chitin-containing compositions preferably contain a total C:N ratio of about 1:1 to about 6:1 preferably about 4:1 or less, with at least 50%, preferably at least 80% of the C:N ratio coming from organic sources. Furthermore, the Kjeldahl "protein" content is at least about 25%, preferably at least about 70% and most preferably over 80%. The remaining ratios which can be calculated from Table 1 define certain preferred embodiments of the composition of this invention.

Because it is the presently preferred chitin-containing embodiment, the preparation and use of the chitin-protein polymer complex obtained from the shells of blue crabs (*Callinectes sapidus*) harvested from the Chesapeake Bay will be described in detail hereinafter.

Table 1 demonstrates the chemical composition of ClandoSan ® raw materials (601, 719 (1220) and 901) and the typically formulated ClandoSan ® compositions (107, 518, 1029 and 1209) of this invention and illustrates the significant differences which exist in nitrogen content and carbon:nitrogen ratios between ClandoSan ® raw materials and the typical formulated compositions of ClandoSan ® products used in commerce. Pulverized crabmeal and ClandoSan ® 601 demealed shell contain about 50% chitin-protein complex. ClandoSan® 1220 contains about 75% chitin-protein complex. ClandoSan® 618 is formulated to contain about 25% chitin-protein complex, about 10% urea and about 40% soybean meal.

meal, sesame meal, dried citrus pulp, dehydrated or sun-cured alfalfa, etc.

The soybean meal and urea compositions of this invention can be prepared by dry blending as illustrated for ClandoSan® containing compositions in Example 2

TABLE 1

| | CLANDOSAN (CHITIN-PROTEIN) BIOLOGICAL CONTROL MATERIALS | | | | | | | | | |
|---|---|---|---|---|---|---|---|---|---|---|
| DESCRIPTION: | 601 DE-MEALED SHELL | 1220 DEMIN-ERALIZED SHELL | 901 601 + 1220 | 107 601 + UREA | 518 901 + UREA | 814 901 + SBM | 1029 518 + SBM | 1209 107 + SBM | 618 SBM + UREA + CRABMEAL | 510 CRAB-MEAL + SBM |
| APPROXIMATE ANALYSIS (%) | | | | | | | | | | |
| MOISTURE | 11.2 | 12.3 | 11.6 | 10.6 | 15.9 | 10.6 | 13.7 | 8.3 | 8.6 | 11.4 |
| ASH | 49.9 | 13.3 | 40.3 | 33.0 | 25.0 | 23.3 | 24.7 | 22.5 | 20.5 | 25.2 |
| ORGANIC MATTER | 38.9 | 74.4 | 48.1 | 56.4 | 59.1 | 66.1 | 61.6 | 69.2 | 67.7 | 63.4 |
| ELEMENTAL ANALYSIS (%) | | | | | | | | | | |
| CARBON (TOTAL) | 22.9 | 36.2 | 28.9 | 22.1 | 23.3 | 35.3 | 27.0 | 30.0 | 31.1 | 33.9 |
| CARBON (ORGANIC) | 17.4 | 35.2 | 24.8 | 18.3 | 20.2 | 33.4 | 24.0 | 27.8 | 29.5 | 31.9 |
| HYDROGEN | 4.0 | 6.1 | 5.0 | 4.5 | 4.7 | 5.1 | 5.1 | 5.0 | 4.6 | 4.9 |
| OXYGEN | 31.8 | 33.7 | 33.6 | 34.0 | 29.7 | 34.2 | 34.0 | 32.0 | 32.6 | 33.9 |
| NITROGEN (KJELDAHL) | 3.7 | 6.6 | 4.5 | 14.8 | 15.4 | 6.0 | 12.3 | 13.7 | 13.4 | 5.9 |
| CALCIUM | 19.3 | 4.4 | 14.2 | 13.5 | 11.6 | 6.9 | 9.3 | 7.8 | 6.0 | 7.0 |
| PHOSPHORUS | 1.8 | 0.8 | 1.5 | 1.3 | 1.2 | 1.0 | 1.2 | 0.8 | 0.9 | 1.0 |
| MAGNESIUM | 0.9 | 0.2 | 0.7 | 0.7 | 0.6 | 0.5 | 0.5 | 0.5 | 0.4 | 0.4 |
| SODIUM | 1.0 | 0.2 | 0.8 | 0.8 | 0.6 | 0.5 | 0.7 | 0.5 | 0.8 | 0.9 |
| POTASSIUM | 0.1 | <0.1 | 0.3 | 0.3 | 0.2 | 0.9 | 0.7 | 0.7 | 1.0 | 1.0 |
| CARBON:NITROGEN ANALYSIS | | | | | | | | | | |
| TOTAL C:N RATIO | 5.4 | 5.3 | 5.6 | 1.5 | 1.4 | 6.4 | 1.9 | 2.2 | 2.4 | 6.3 |
| ORGANIC C:N RATIO | 4.1 | 5.2 | 4.9 | 1.2 | 1.2 | 6.1 | 1.7 | 2.1 | 2.3 | 5.9 |
| KJELDAHL "PROTEIN" (%) | 23.0 | 41.4 | 28.3 | 92.5 | 96.0 | 37.3 | 76.8 | 85.8 | 83.4 | 36.9 |

CRUSTACEAN (BLUE CRAB) SOURCE; SBM = SOYBEAN MEAL

B. The Soybean Meal-Urea Compositions

In the soybean meal-urea compositions of this invention, the ratio by weight of soybean meal to urea provided by a source thereof (within the present invention, the term "urea" is often used to mean "source of urea", i.e., any of the well known inorganic or organic substances usable in agriculture as a source of urea are employable herein, such as isobutyldienediurea (IBDU), crotonylidiene diurea (CDU), difurforylidene triureide, oxalyldiuride, biuret and triuret is about 2:1 to 8:1, preferably about 2:1 to 6:1. The total C:N ratio of the soybean meal-urea composition is below about 5, preferably below about 4, with a nitrogen content (%) of about 12 to 22% preferably about 13 to 20%, corresponding to a Kjeldahl protein of over about 70%, about 75 to 137.5%, preferably about 81.25 to 125%. The actual amounts in weight of soybean meal and urea or source of urea material in the soybean meal-urea compositions of this invention are such to provide in practice about 1 to 3 grams of soybean meal plus urea per kilogram of soil in which said composition is admixed. These application values roughly translate to about 1 to 3 tons of soybean meal plus urea per treated acre (on a broadcasted or banded basis) based on admixture to a depth of about 6 inches.

For part or all of the soybean meal, there can be substituted other vegetable, fruit and nut meals such as cottonseed meal, sunflower seed meal, linseed meal, peanut meal, safflower meal, corn gluten meal, jojoba herein or through pellet formation as described hereinafter.

C. Application of the Compositions

A nematocidal or nematistatic composition of the present invention is employed by admixing it with a suitable plant growth medium, e.g., soil containing both inorganic clay minerals and organic humus substances, and the admixture preferably extends to the root zone of a selected crop growing therein. For horticultural applications, the plant growth medium is generally a potting soil; although inorganic growth media can in principle be employed, they must contain the requisite microflora or the desired effect will not be achieved.

For ease of application and ensuring a gradual release of ammoniacal nitrogen, it is preferred that the composition be applied in the form of granules, pellets or prills.

In its method aspect, the present invention admixes at least a nematistatically effective and non-phytotoxic amount of the desired amendment with a suitable plant growth medium to suppress the growth of the plant-pathogenic nematodes. Preferably, the admixing is done at least one week prior to seeding or planting in the plant growth medium. On a commercial scale, these compositions are plowed and harrowed, tilled, rototilled or otherwise mixed into the topsoil (Horizon A) and subsoil (Horizon B) layers of agricultural soils and into all layers of potting and nursery stock soils, preferably 1–3 weeks before planting of living seeds or seedlings and tree saplings in order to stimulate the growth and proliferation of actinomyces and other normal soil microorganisms which produce enhanced levels of chitinase and urease enzyme activity and enhanced levels of ammonia in these soils.

Plants susceptible to nematode infestation which can be aided with the present invention include but are not limited to field crops, such as tobacco, peanuts, rice and cotton; fruit and nut crops, such as strawberries, cranberries, dates, pineapples, olives, coffee and tea; citrus fruits including oranges, tangerines, temples, grapefruit, lemons, limes, and tangelos; deciduous fruits including apples, apricots, bananas, cherries, grapes, nectarines, kiwi fruit, peaches, pears, plums and prunes; and nuts including almonds, filberts, macadamias, pecans, pistachios and walnuts; commercial vegetable and melon crops, such as celery, eggplant, lettuce, tomatoes, peppers, cauliflower, onions, carrots, broccoli, honeydew melons, white potatoes, and sweet potatoes; and floral crops, lawns and turf, and ornamentals, including cut flowers, flowering pot plants and bedding and foliage plants, including orchids, chrysanthemums, begonias, gardenias, poinsettias, boxwood and ferns, and turfgrasses for golf courses, cemeteries, office and industrial parks, recreational parks, and lawns. The compositions of the present invention can be used in conjunction with other known soil amendments, e.g., a source of either acid or base to adjust the hydrogen ion concentration of the soil.

Because of the enhanced nematicidal activity and fertilizer effect that is induced by combining other nitrogenous and carbonaceous materials with the nematicidally active chitin-protein complex described by McCandliss, Eastwood and Milch in U.S. Pat. No. 4,536,207, the contents of which are incorporated by reference herein, addition to soils of the compositions of matter described herein provides an economically and environmentally attractive means for reducing food, fiber and economic losses due to nematode infestations and a means for the economical use of otherwise low value and polluting industrial wastes.

Without further elaboration, it is believed that one skilled in the art can, using the preceding description, utilize the present invention to its fullest extent. The following preferred specific embodiments are, therefore to be construed as merely illustrative and not limitative of the remainder of the disclosure in any way whatsoever. All temperatures are set forth uncorrected in degrees Celsius; unless otherwise indicated, all parts and percentages are by weight.

The following examples are provided for illustrative purposes only and are in no way intended to limit the scope of the present invention.

EXAMPLE 1

Production and Chemical Composition of ClandoSan ® Raw Materials

Wastes remaining after the processing of shellfish (i.e., crab, crayfish, lobster, prawns and shrimp) and fungal mycelial wastes remaining after industrial fermentation processes comprise the preferred feedstock raw materials to provide the chitin component used in this invention. Crab, crayfish and lobster shells were processed in an identical manner, as described below. Shrimp shells and fungal mycelia can be similarly processed.

Crab shell wastes remaining after the claws and bodies of blue crabs (*Callinectes sapidus*) have been run through a mechanical picker or have been manually picked to separate edible meat from shell waste materials ("parts") were water-washed and, while still wet, were mechanically shredded at ambient temperatures in a Model AU-6173WL Beehive General Deboning Machine (a twin screw separator), as described in McFarland, U.S. Pat. No. 3,825,231 issued July 23, 1974. Meat shards adherent to shell wastes were separated in the machine and passed through the perforated chamber in the auger housing of the Beehive separator as a separate process stream ("deboned meal stream"). Residual shell fragments, which were largely free of adherent meat shards, were carried and discharged through the auger ports and ring valve of the machine as a second process stream ("demealed shell stream"). In typical operations, approximately 45% (on a wet weight basis) of shell waste starting material was represented by deboned meal and approximately 55% was represented by demealed, or residual, shell.

The deboned meal stream was collected and stored at 0° to $-4°$ C. for use as a raw material in the production of flavors and other food products.

The demealed shell stream, with or without supplementation with fresh crab parts (i.e., water washed but otherwise unprocessed crab shell wastes), constituted the principal raw material for preparing certain of the nematicide products of this invention. The chitin-protein complex of demineralized crustacean shells constituted the principal raw material for the nematicide product described by McCandliss (U.S. Pat. No. 4,536,207).

Demealed shell without any supplementation was collected from the Beehive Separator, water washed a second time, and then dried in a hot-air oven at 100° C. for approximately 16 hours. The dried material was finally ground and milled to a particle size such that all of the material passed through a No. 25 U.S.A. Standard Sieve. The resulting material was given the designation "ClandoSan ® 601."

Otherwise unprocessed crab shell wastes (i.e., "fresh crab parts") were mechanically pulverized in a conventional hammer mill and then dried in a similar manner. When added to dried demealed shell (i.e., ClandoSan ® 601), the resulting dry material was designated as "crude crab shell powder."

In alternative operations, demealed shell fragments collected from the Beehive Separator after washing but before drying were used as a raw material feedstock for the preparation of demineralized shell fragments, in accordance with the method of McCandliss (U.S. Pat. No. 4,536,207). Approximately 45 pounds of deboned shell were slowly added to approximately 30 gallons of 1.6N hydrochloric acid in a 55 gallon stainless steel stirred tank reactor to manufacture pilot quantities of demineralized shell. The rate of addition of shell feedstock was regulated so as to minimize foaming over the course of an approximately 20-minute demineralization reaction. Acid was added, as necessary to assure maintenance of the pH at or below 1.5 throughout the 20-minute reaction period.

Insoluble material remaining after completion of the demineralization reaction was collected on a Sweco ® Vibro-Energy ® separator equipped with a 100-mesh stainless steel screen, reslurried and brought to pH 7.0 in approximately 400 ml aqueous calcium carbonate and then washed with water until the effluent wash water had the same conductivity as influent wash water. Neutralized and water-washed demineralized shell fragments were then dried at 100° C. for approximately 16 hours followed by grinding and milling to a particle size such that all the material passed through a No. 25 U.S.A. Standard Sieve. The resulting dry material was given the designation "ClandoSan ® 719" or "ClandoSan ® 1220", depending only on the date of production.

Manufacture of semiworks quantities of ClandoSan ® 719 (or ClandoSan ® 1220) was undertaken in an essentially similar manner. Approximately 4,000 pounds of fresh crab parts (i.e., unprocessed shell wastes of crab processing operations) generally yielded only about 900 pounds of the dried final ClandoSan ® 719 (1220) product. Chemical composition of the two raw materials. ClandoSan ® 601 (demealed shell) and ClandoSan ® 719 or ClandoSan ® 1220 (demineralized shell), was determined by standard methods and is illustrated in Table 1, supra.

Figure 2:
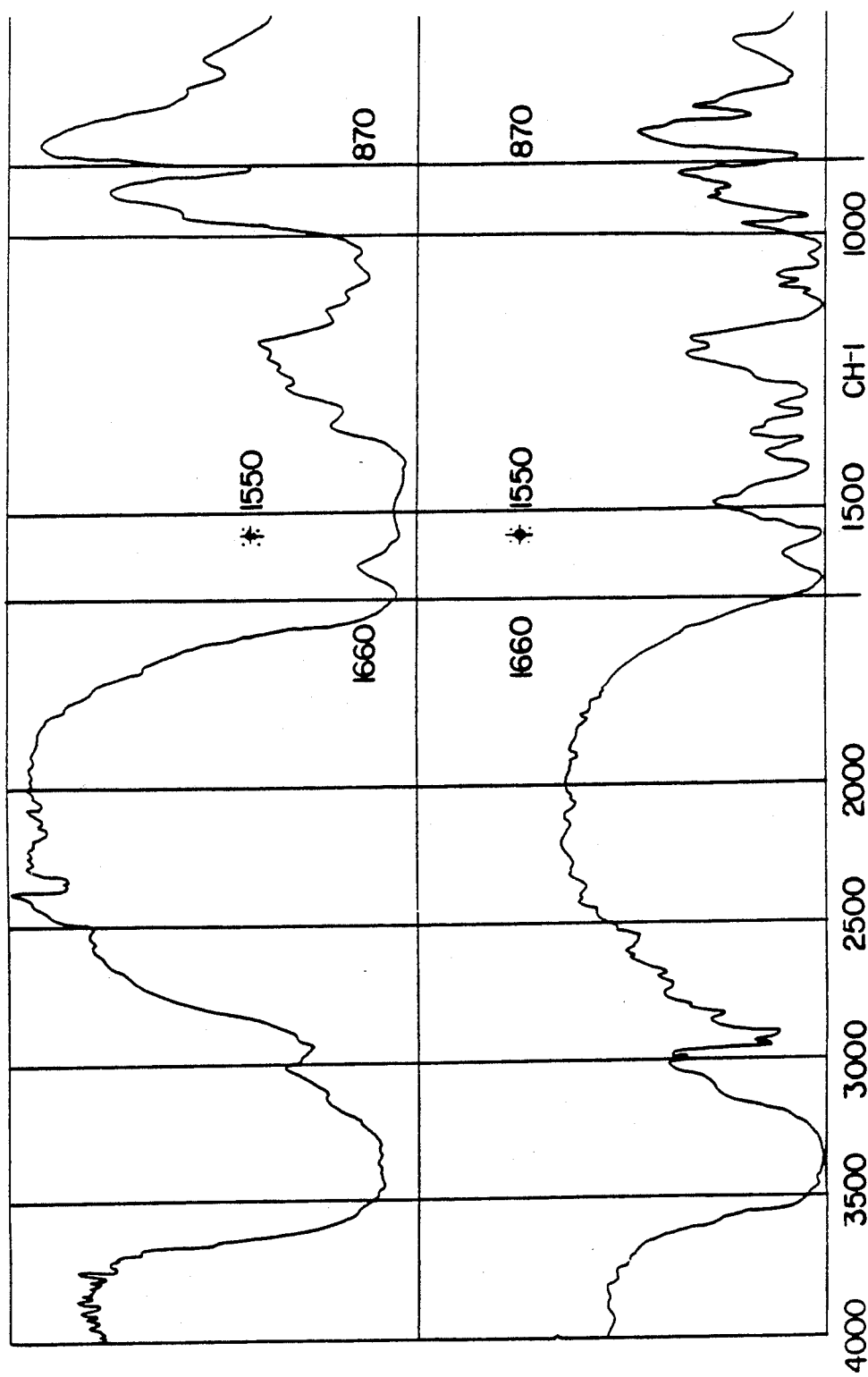
FIG. 2 is typical infrared spectra of the demineralized chitin-protein complex (ClandoSan ® 719 or 1220) usable in the practice of certain embodiments of this invention and of a commercial source of purified N-acetyl-D-glucosamine.
Figure 3:
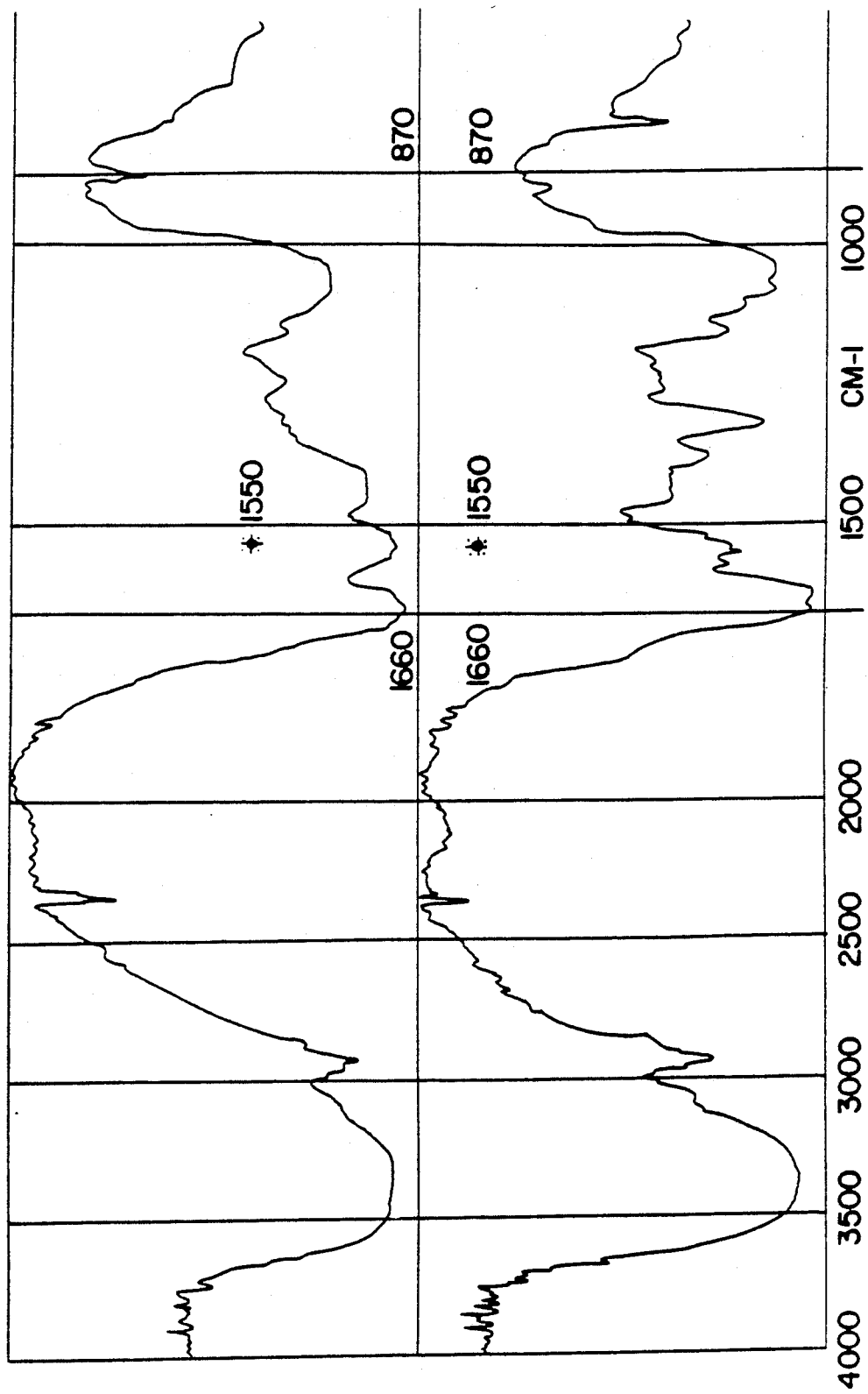
FIG. 3 is typical infrared spectra of other chitin materials usable in the practice of certain embodiments of this invention, namely, of undemineralized horseshoe crab chitin-protein complex prepared by the method described in Example 1 and of fungal mycelial wastes from citric acid industrial fermentations.

Infrared spectra of dried ClandoSan ® raw material powders prepared in the form of potassium bromide (KBr) discs by standard methods demonstrated no essential spectral differences between ClandoSan ® 601 (i.e., demealed shell), ClandoSan ® 719 (1220) (i.e., demineralized crab shell chitin-protein complex) and commercial sources of chitin and N-acetyl-D-glucosamine. All four materials appeared to contain an acetyl constituent as shown by a characteristic infrared absorption band (amide I) at 1660 cm$^{-1}$ and a typical downward shift of the amide II band from 1595 cm$^{-1}$ to 1550 cm$^{-1}$ with an added absorption band at 870 cm$^{-1}$ (FIGS. 1 and 2). Fungal mycelial wastes from citric acid industrial fermentations and undemineralized powders obtained from horseshoe crab exoskeletons demonstrated similar spectral absorptions (FIG. 3).

EXAMPLE 2

Production and Chemical Characterization of Typical ClandoSan ® Compositions ClandoSan ® raw materials prepared as described in Example 1 were formulated into ClandoSan ® compositions by dry blending ClandoSan ® 601 (demealed shell) and/or ClandoSan ® 719 (1220) (demineralized shell) with agricultural grades of the following nitrogenous materials: (i) urea; (ii) dibasic ammonium phosphate (DAP); and (iii) soybean meal (SBM).

Solids were passed through a No. 25 U.S.A. Standard Sieve and blended at room temperature in a twin shell (vee cone) mixer for approximately 10 minutes to assure adequate homogenization of the mixture with little or no segregation of particles. The various formulations were given the designations listed below:

| Composition | Components |
| --- | --- |
| ClandoSan ® 601 | ClandoSan ® 601 |
| ClandoSan ® 719 (1220) | ClandoSan ® 719 (1220) |
| ClandoSan ® 719-U | ClandoSan ® 719 (1220) + Urea |
| ClandoSan ® 901 | ClandoSan ® 601 + ClandoSan ® 719 (1220) |
| ClandoSan ® 107 | ClandoSan ® 601 + Urea |
| ClandoSan ® 518 | ClandoSan ® 901 + Urea |
| ClandoSan ® 814 | ClandoSan ® 901 + SBM |
| ClandoSan ® 1029 | ClandoSan ® 901 + Urea + SBM |
| ClandoSan ® 1209 | ClandoSan ® 601 + Urea + SBM |
| ClandoSan ® 1225 | ClandoSan ® 601 + DAP |

"Powder" mixtures prepared as described in Example 1 and as defined above, were used in all greenhouse and early field experiments. Later field studies used pelletized forms of the various ClandoSan ® formulations. Pellets were formed, without adding lubricants or binders, at 100°-120° F. and at a rate of 120-180 pounds/hour using a model CL-3 pellet mill (California Pellet Mill Company, Crawfordsville, Ind.) equipped with 5/32×¾ inch or ⅛×¾ inch die holes rotating at approximately 250 rpm. The bulk density of input mixtures approximated 30 pounds per cubic foot with a moisture content of 8% and the bulk density of the resulting pellets approximated 45-48 pounds per cubic foot.

Chemical composition of certain of the typical ClandoSan ® compositions is illustrated in Table 1. Particular attention is directed to (i) the higher contents of total Kjeldahl nitrogen, and thus Kjeldahl "protein" content, and (ii) the lower C:N ratios of the formulated ClandoSan ® compositions (i.e., ClandoSan ® 107, 518, 1029 and 1209) relative to the corresponding contents of the ClandoSan ® raw materials (i.e., ClandoSan ® 601, 719 (1220) and 901).

EXAMPLE 3

Nematicidal and Fertilizer Effects of Soil Amendments: Experimental Design and Effects of Clandosan Materials The effect of ClandoSan ® raw materials (i.e., demealed shell ClandoSan ® 601, demineralized shell ClandoSan ® 719 (1220) and mixtures designated as ClandoSan ® 901) on the growth of squash and tomato plants were studied in greenhouse experiments using a sandy loam soil (pH 5.8 to 6.2) which was collected from a peanut (*Arachis hypogaea* L.) field near Headland, Ala., and was naturally infested with the peanut root-knot nematode *Meloidogyne arenaria* (Neal) Chitwood. The effects of soybean meal, urea and mixtures of soybean meal and urea both alone and in combination with agricultural grade ammonium phosphate and various industrial wastes, specifically spent fungal mycelia from industrial fermentations and crustacean shell wastes remaining after commercial seafood processing operations, on the growth of squash and tomato plants were studied in the same manner.

The soil was screened (1 mm mesh) to remove large particles and crop debris, mixed 1:1 (v/v) with builder's sand, moistened to achieve approximately 60% field capacity (F.C.) and apportioned in 4-liter capacity polyethylene bags.

Samples of feed grade soybean meal, agricultural grade urea and ammonium phosphate and industrial chitinous wastes prepared as described in Examples 1 and 2 were passed through a 1 mm sieve and thoroughly mixed by shaking with 1 kg aliquots of soil to provide soil amendment concentrations of from 1.0 to 20.0 grams per kilogram soil (0.1 to 2.0% w/w). Soils receiving no amendments were handled in a similar manner. Amended and control soils were then placed in polyvinyl chloride cylindrical pots (10 cm diameter, 1 liter volume) and the pots were allowed to stand from 1-3 weeks on a greenhouse table to permit partial decomposition of the amendments by soil microorganisms. Amended and untreated soils were disposed in the greenhouse in a completely randomized arrangement. Eight replications (pots) were used for each soil amendment, or treatment,

First Planting

After this 1—3 week "incubation" period, five "Summer (or, Yellow) Crookneck" squash (*Cucurbita pepo*

L.) seeds were planted in each pot. The plants were watered daily and were then removed from the soil and two 100 cc sample of soil were taken from each pot. The first sample was used to determine nematode numbers using the "salad bowl" incubation method described by Rodriguez-Kabana and Pope, *Nematropica.* 11:175-185 (1981); the second sample was used for microbial and chemical analysis. Samples for microbial analysis were stored moist at 5° C. prior to use. Residual soil was spread on aluminum foil to air-dry at 25°-27° C. after which it was stored in polyethylene bags at 4° C. in the dark until further analyzed.

Squash plants were washed and the number of galls caused by *M. arenaria* in the roots were counted. The height of the shoot and the fresh weights of the shoots and roots were also measured. In addition, two subjective ratings of the roots were made. The first was a root-knot galling index based on a scale of 0-10, where 0 represents no galling and 10 represents the maximum level of galling as described by Zeck, *Pflanzenschutz-Nacht,* 24:141-144 (1971). The second subjective rating was an evaluation of the general appearance of the roots based on a scale of 1 to 5, where 1 represents the best root condition (abundant root hairs and rootlets without necrotic tissue) and 5 represents the worst condition (roots showing restricted development, no root hairs or fine roots, and widespread necrotic tissue).

Soil pH was measured using 10 grams of air-dried soil suspended in a plastic cup containing 10 ml of demineralized water. The suspension was stirred and allowed to stand for 30 minutes after which time the pH was measured using a Model 12 Corning pH meter. Following pH determination, the soil suspension was diluted with an additional 10 ml of demineralized water, and 10 ml of the diluted suspension were centrifuged (20 minutes at 5.000 x g) for measurement of electrical conductivity. Conductivity of the supernatant was determined using a Model RC 16 B2 Industrial Instruments Wheatstone Bridge fitted with a conductivity cell (k=1.0).

Second Planting

Following the removal of the squash plants and soil samples, the remaining soil in each pot was thoroughly mixed and planted with a single four-week old "Rutgers" tomato (*Lycopersicon esculentum* Mill.) seedling. These were maintained as described for the squash for an additional period of five to eight weeks. After this period, the tomato plants were removed, washed, measured and evaluated as described for the squash.

Figure 4:
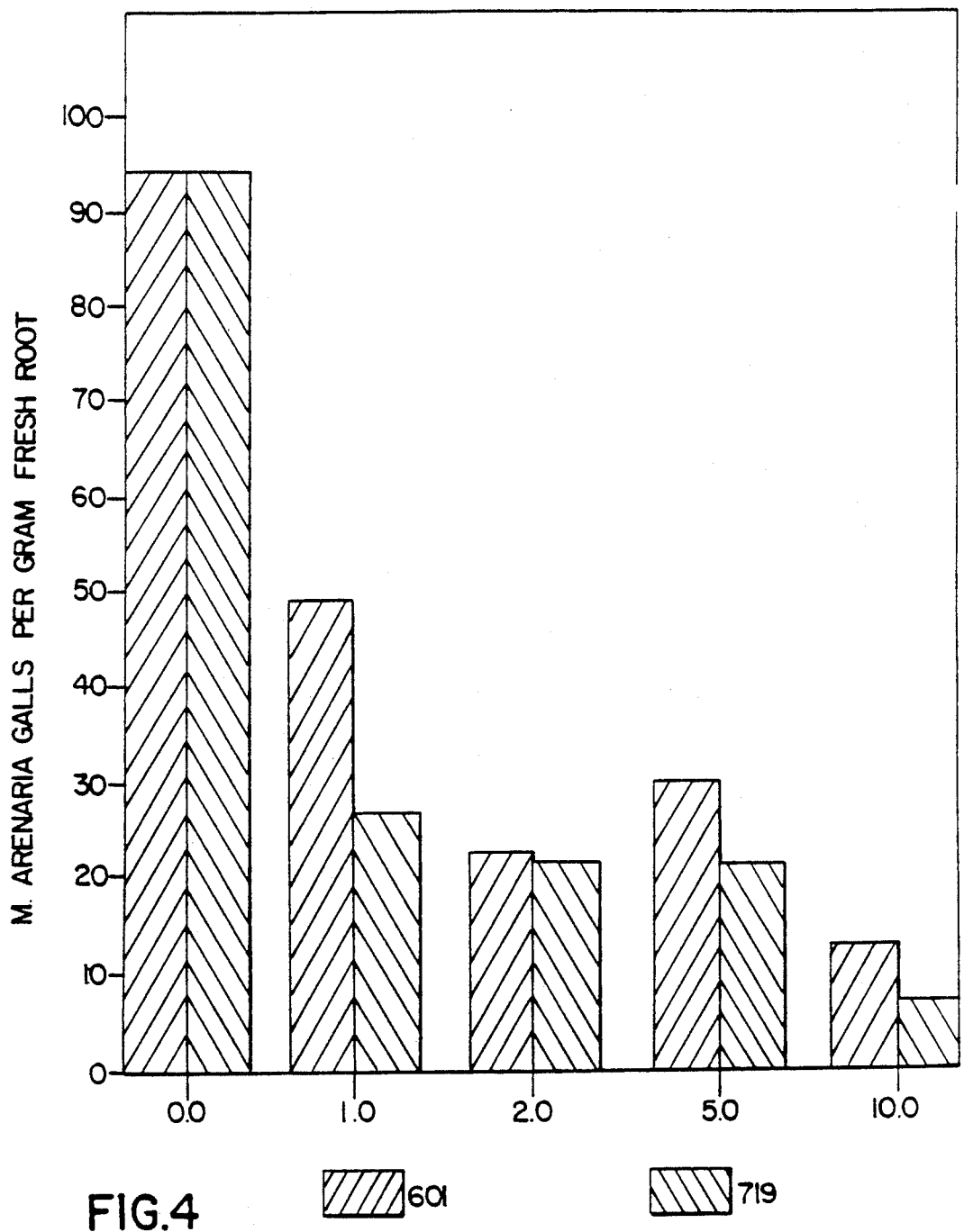
FIG. 4 depicts the generally more pronounced nematicidal effects typically induced in soil by demineralized crustacean chitin-protein complexes (e.g., ClandoSan ® 719 or 1220) relative to the demealed but undemineralized crustacean shells (e.g., ClandoSan ® 601).
Figure 5:
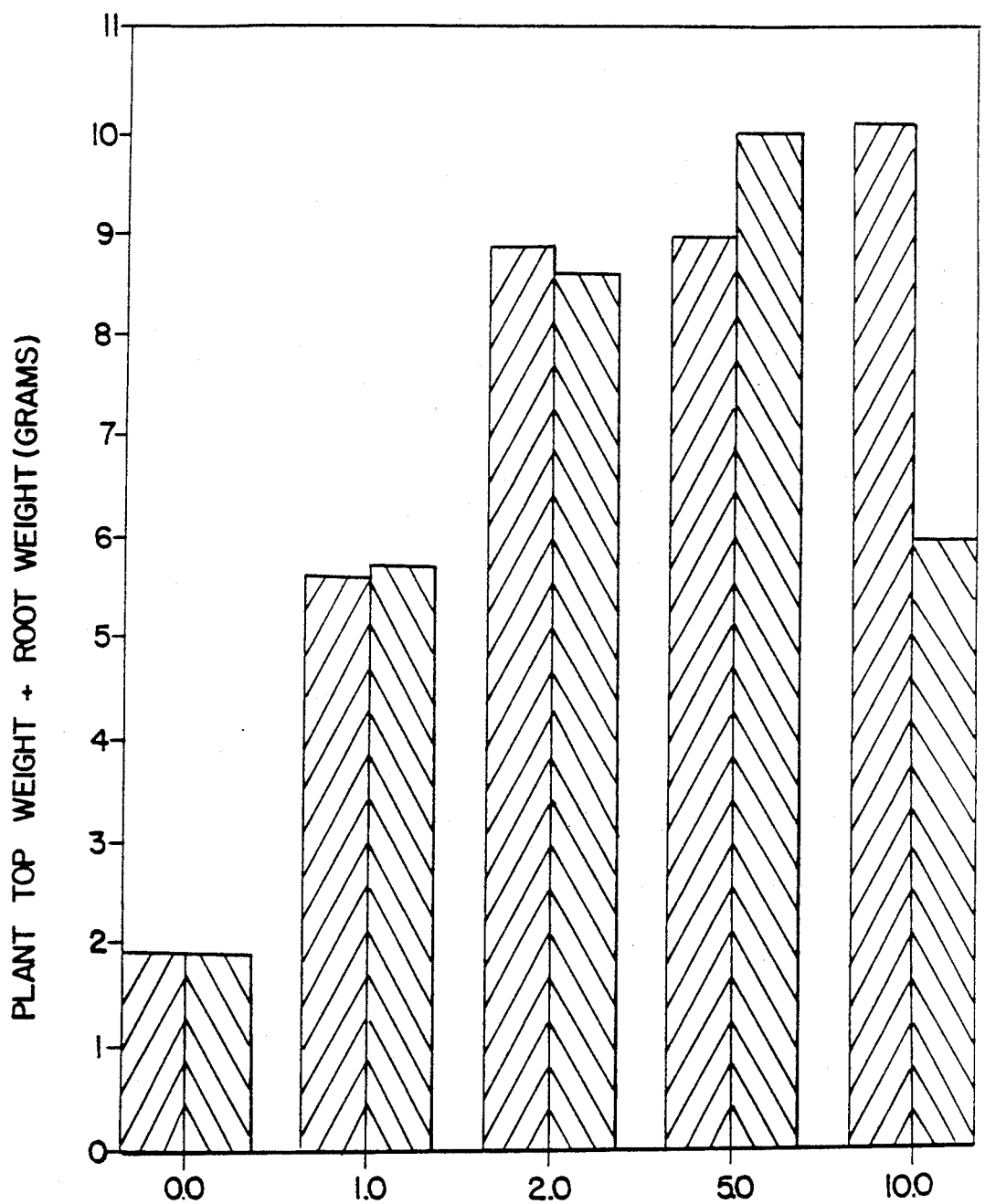
FIG. 5 depicts the plant growth (fertilizer) effects of ClandoSan ® raw materials at low soil amendment concentrations (e.g., up to 5 grams per kilogram soil) and the phytotoxicity or growth retardation effects which develop at higher concentrations of the soil amendments, as illustrated with ClandoSan ® 719 or 1220.

All data were analyzed using standard factorial analysis procedures and standard tests for statistical significance. Representative results of greenhouse experiments conducted with ClandoSan ® raw materials as soil amendments are illustrated in Table 2 and FIGS. 4 and 5.

Table 2 demonstrates the concentration-dependent nematicidal and plant growth (fertilizer) effects of ClandoSan ® raw materials on the growth of squash in nematode-infested soil and illustrates the phytotoxic effects at high soil concentrations i.e., 10.0 g/kg of the chitin-protein complex (ClandoSan ® 719) of this invention and the ameliorating effects achieved by diluting the chitin-protein complex by additions of demealed but undemineralized ClandoSan ® raw material (i.e., ClandoSan ® 601) of this invention.

In all experiments of this Example, ClandoSan ® raw materials induced significant adverse concentration-dependent effects on nematode populations in soils, as measured by a sharp reduction in the number of galls, gall rate and the number of galls per gram of fresh root in squash plants grown in amended soils relative to plants grown in the untreated control soils (nematicidal effects). Subjective evaluations of root condition tended to suggest that undemineralized crustacean shell amendments induced somewhat greater protective effects on root condition at high soil concentrations than the demineralized chitin-protein amendments and that subjectively estimated worsening of root conditions in plants grown in soils amended with the demineralized ClandoSan ® raw material (i.e.. ClandoSan ® 719 or 1220) could be reversed by diluting the demineralized amendments by additions of the undemineralized material (i.e., ClandoSan ® 601).

Similarly, in all experiments ClandoSan ® raw materials induced a significant increase in plant growth, as measured by the top height, top weight and plant weight of squash grown in amended nematode-infested soils relative to that of plants grown in the untreated nematode-infested control soils (fertilizer effects). At high soil concentrations (e.g., 10 gm/kg), plants grown in soils amended with the demineralized chitin-protein raw material (i.e., ClandoSan ® 719 or 1220, characterized by a relatively high Kjeldahl "protein" content) demonstrated significantly reduced root weights relative to those grown in soils amended with the undemineralized raw material (i.e. ClandoSan ® 601, characterized by a relatively lower Kjeldahl "protein" content) resulting in a reversal of the stimulatory effects on plant growth observed at lower soil concentrations (phytotoxic effects). Phytotoxic effects, as measured by effects on root weights, were reversed by diluting the demineralized amendments with increasing amounts of the undemineralized raw material (i.e., ClandoSan ® 901 mixtures).

Figure 6:
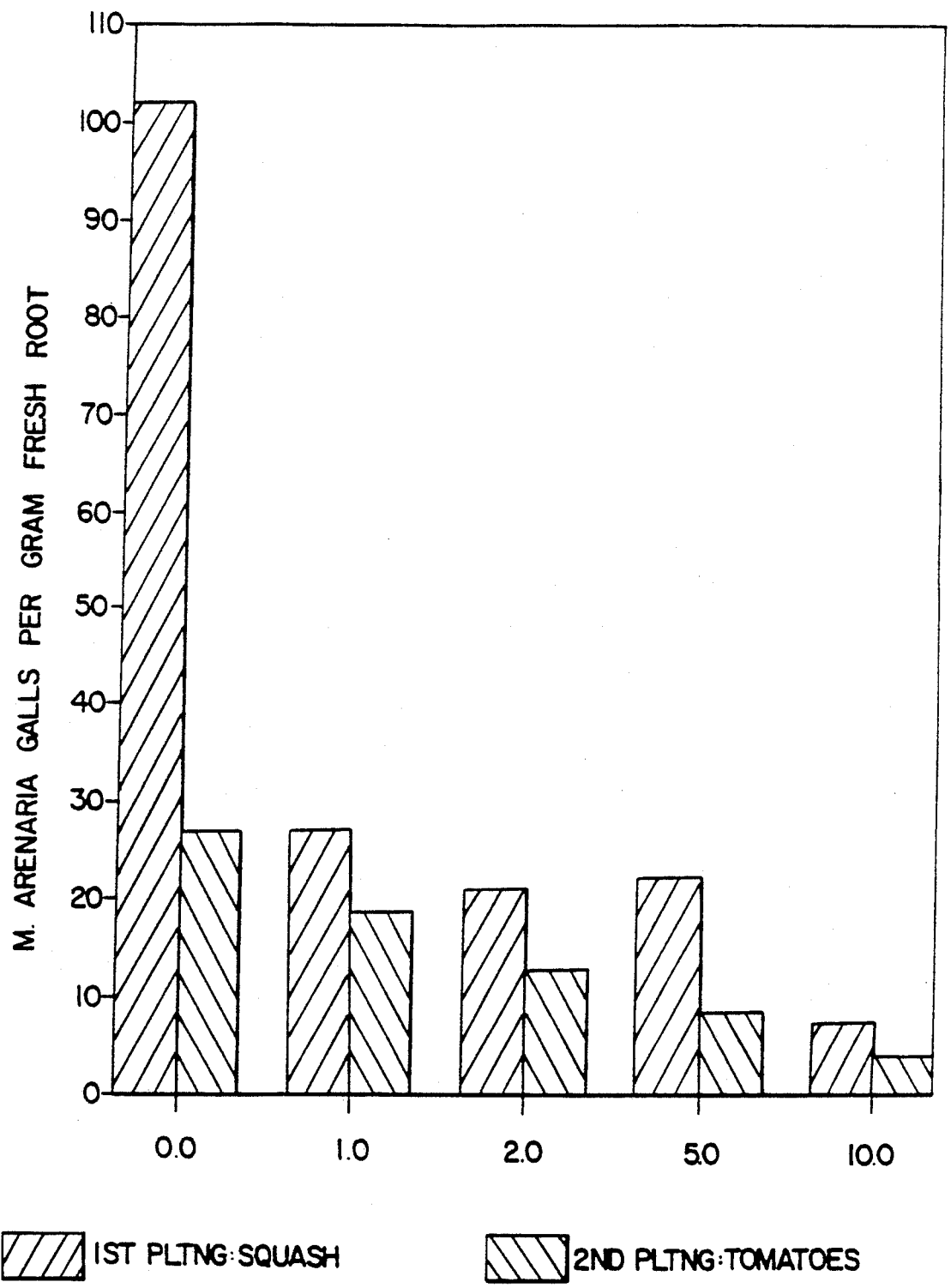
FIG. 6 illustrates the sustained nematicidal effects of ClandoSan ® 719 (1220) amendments in both squash (first planting) and tomatoes (second planting).
Figure 7:
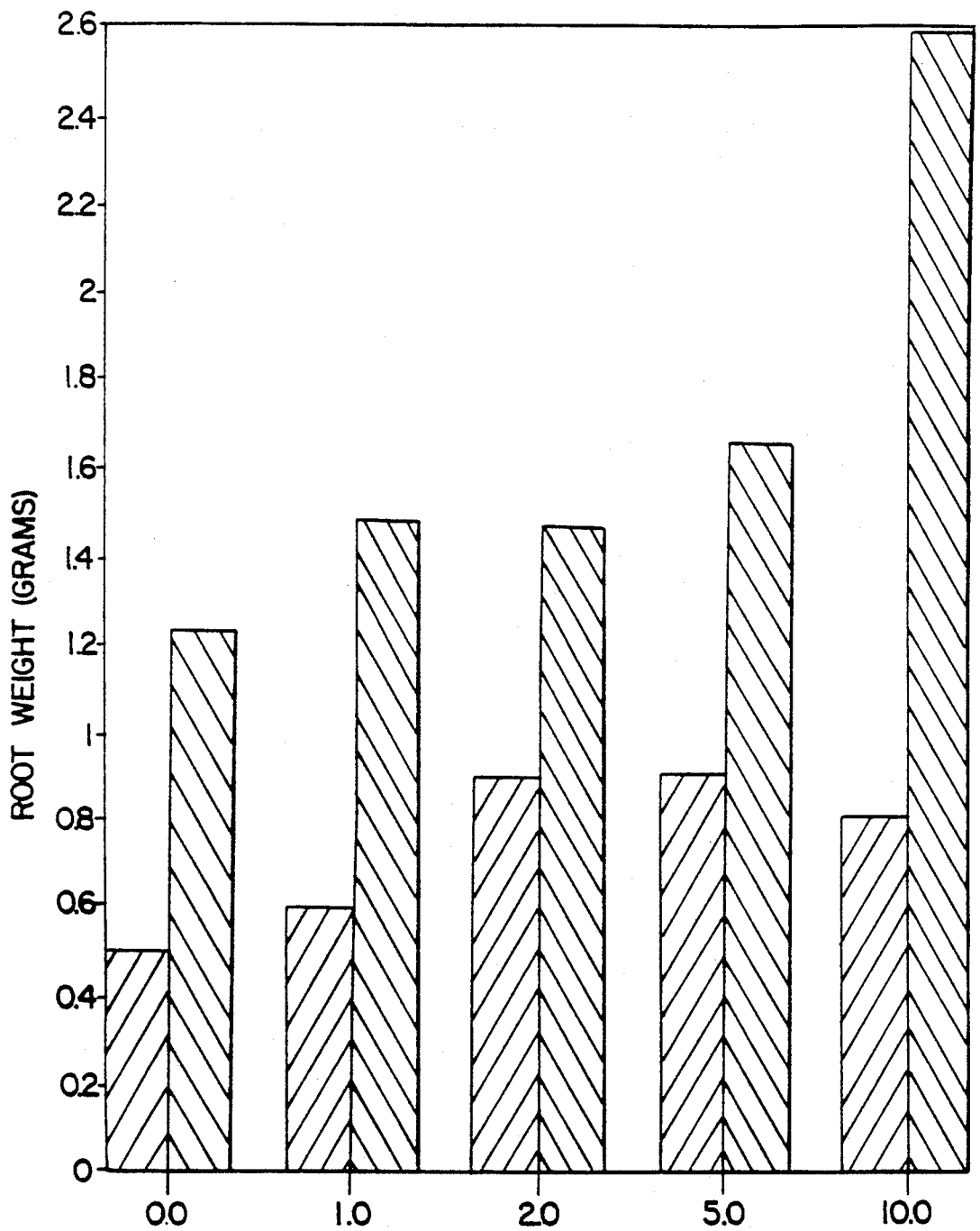
FIG. 7 depicts the reversal of phytotoxic effects at high soil amendment concentrations (i.e., in excess of 5 grams per kilogram soil) in tomato plants grown in the same soils in which phytotoxic effects were observed in squash plants.

Phytotoxic effects present in the first (squash) plantings at soil concentrations in excess of 2-5 grams per kilogram (Table 2) were not present in the second (tomato) plantings either with the demineralized ClandoSan ® 719 material or the undemineralized ClandoSan ® 601 material. On the other hand, nematicidal activity present in the first (squash) planting, as measured by galls per gram of fresh root, was sustained in essentially all experiments and all concentrations in the second (tomato) plantings (FIGS. 6 and 7).

Table 2 illustrates the onset of phytotoxic effects, as measured by plant root weight, with demineralized ClandoSan ® 719 (1220) compositions that is associated with the nematicidal effects of the composition and the reversal of these effects by addition of undemineralized ClandoSan ® 601 compositions. The table also illustrates that phytotoxic effects which are observed with squash plants (first planting), as measured by galls per gram of fresh root, in nematode-infested soils following amendment with high concentrations of ClandoSan ® raw materials is reversed when tomato plants (second planting) are repotted without other soil amendments in the same soils but that the nematicidal effects of the soil amendments persist beyond the first planting.

Chemical composition of selected soybean and urea compositions and of various waste products of industrial processes, specifically seafood and fermentation processes, is illustrated in Table 3. These materials are utilized in the formulations of Example 7.

TABLE 2

EFFECTS OF CLANDOSAN ® RAW MATERIALS

Sandy Loam Soil (Headland) — Set up Day 0
Summer Crookneck Squash — Squash Planted Day 13
Rutgers Tomatoes — Harvested Day 48
Meloidogyne Arenaria (Neal) — Tomatoes Planted Day 48
Harvested Day 118

| Composition | Conc.(1) Soil Amendment (G/KG) | First Planting: Squash Root Weight (GM.) | Galls/GM. Root | Second Planting: Tomatoes Root Weight (GM.) | Galls/GM. Root |
|---|---|---|---|---|---|
| Control | 0 | 0.5 | 102.0 | 1.23 | 26.8 |
| ClandoSan ® | 1.0 | 0.7 | 27.1 | 1.56 | 18.6 |
| (Demineralized shell) | 2.0 | 0.7 | 21.4 | 1.75 | 12.6 |
|  | 5.0 | 0.6 | 6.7 | 2.10 | 8.1 |
|  | 10.0 | 0.3 | 6.7 | 3.74 | 3.5 |
| ClandoSan ® 601 | 1.0 | 0.6 | 50.0 | 1.48 | 13.5 |
| (Demealed shell) | 2.0 | 0.9 | 22.2 | 1.47 | 8.8 |
|  | 5.0 | 0.9 | 31.1 | 1.65 | 12.1 |
|  | 10.0 | 0.8 | 12.5 | 2.58 | 2.3 |
| ClandoSan ® 901 Mixture | 1.0 | 0.7 | 54.3 | 1.19 | 17.6 |
| (25% 601 plus 75% 1220) | 2.0 | 0.9 | 30.0 | 1.93 | 18.7 |
|  | 5.0 | 0.8 | 18.8 | 2.33 | 11.6 |
|  | 10.0 | 0.6 | 6.7 | 2.30 | 7.4 |
| ClandoSan ® 901 Mixture | 1.0 | 0.6 | 53.3 | 1.38 | 16.7 |
| (50% 601 plus 50% 1220) | 2.0 | 0.8 | 32.5 | 1.31 | 9.9 |
|  | 5.0 | 1.0 | 20.0 | 2.27 | 9.7 |
|  | 10.0 | 0.6 | 6.7 | 3.16 | 3.8 |
| ClandoSan ® 901 Mixture | 1.0 | 0.7 | 48.6 | 1.36 | 18.4 |
| (75% 601 plus 25% 1220) | 2.0 | 0.8 | 31.3 | 1.46 | 8.9 |
|  | 5.0 | 0.8 | 28.8 | 2.43 | 15.6 |
|  | 10.0 | 0.8 | 13.8 | 3.11 | 3.2 |

(1)Gall rate scale: 0 = no galls; 10 = worst

TABLE 3

CHEMICAL COMPOSITION OF COMPONENTS OF CLANDOSAN (CHITIN-PROTEIN) BIOLOGICAL CONTROL MATERIALS

| DESCRIPTION: | SOYBEAN MEAL (SBM) | UREA | DIAM-MONIUM PHOSPHATE | UNPRO-CESSED CRAB MEAL | FUNGAL MYCELIUM | HORSE-SHOE CRAB | PANA-MA SHRIMP | CHI-TIN | CHIT-OSAN |
|---|---|---|---|---|---|---|---|---|---|
| APPROXIMATE ANALYSIS (%) | | | | | | | | | |
| MOISTURE | 6.7 | <1.0 | 1.8 | 13.2 | 5.4 | 10.1 | 11.7 | 6.2 | 11.5 |
| ASH | 6.1 | <0.1 | 45.4 | 44.6 | 5.5 | 23.1 | 30.0 | 5.2 | 2.5 |
| ORGANIC MATTER | 87.2 | 100.0 | 52.8 | 42.2 | 89.1 | 68.0 | 58.3 | 88.6 | 86.0 |
| ELEMENTAL ANALYSIS (%) | | | | | | | | | |
| CARBON (TOTAL) | 42.1 | 20.3 | 0.3 | 26.0 | 44.6 | 36.4 | 31.8 | 41.6 | 38.7 |
| CARBON (ORGANIC) | 42.1 | 20.2 | 0.2 | 21.9 | 44.6 | 35.0 | 29.0 | 37.3 | 38.7 |
| HYDROGEN | 6.8 | 6.7 | 4.8 | 4.5 | 6.7 | 5.9 | 4.8 | 6.4 | 7.0 |
| OXYGEN | 34.5 | 25.8 | 20.3 | 33.0 | 38.9 | 29.8 | 32.0 | 42.6 | 43.9 |
| NITROGEN (KJELDAHL) | 7.8 | 46.4 | 12.5 | 4.4 | 4.5 | 8.2 | 6.7 | 6.0 | 6.6 |
| CALCIUM | 0.3 | 0.1 | 1.3 | 13.9 | 2.1 | 5.2 | 10.9 | 1.7 | 0.3 |
| PHOSPHORUS | 0.6 | <0.1 | 15.3 | 1.4 | 0.1 | 0.7 | 2.0 | 0.7 | 0.1 |
| MAGNESIUM | 0.3 | <0.1 | 0.3 | 0.6 | <0.1 | 0.2 | 0.8 | 0.2 | 0.0 |
| SODIUM | 0.0 | <0.1 | 0.1 | 1.6 | <0.1 | 1.4 | 0.4 | 0.1 | 0.7 |
| POTASSIUM | 1.7 | <0.1 | 0.2 | 0.4 | <0.1 | 0.3 | 0.1 | <0.1 | <0.1 |
| CARBON:NITROGEN ANALYSIS | | | | | | | | | |
| TOTAL C:N RATIO | 5.3 | 0.4 | 0.02 | 5.2 | 9.9 | 4.5 | 4.6 | 6.6 | 5.3 |
| ORGANIC C:N RATIO | 5.3 | 0.4 | 0.02 | 4.4 | 9.9 | 4.3 | 0.4 | 5.9 | 5.3 |
| KJELDAHL "PROTEIN" (%) | 48.8 | 289.7 | 78.3 | 27.3 | 28.2 | 51.0 | 41.6 | 37.3 | 41.3 |

EXAMPLE 4

Nematicidal and Fertilizer Effects of Urea and Chitin-Protein/Urea Soil Amendments

The facts (i) that each of the chitin-containing ClandoSan ® raw materials of this invention had similar relatively low C:N ratios of approximately 5.4 and (ii) that the phytotoxic effects at high concentrations of chitin-containing soil amendments with relatively high "protein" contents as measured by Kjeldahl nitrogen determinations. (i.e., demineralized ClandoSan ® 719 or 1220) could be reversed by additions of ClandoSan ® raw materials having relatively lower "protein" contents as measured by Kjeldahl nitrogen determinations (i.e., ClandoSan ® 601) suggested that it might be possible to develop a formulation which had exceptional nematicidal properties without inducing phytotoxic effects simply by adding a source of organic nitrogen to undemineralized chitin-containing ClandoSan ® raw materials. Since urea, which has a strikingly low C:N ratio of 0.4, is known to be a good nematicide but has phytotoxic effects at nematicidal soil concentrations, it was reasoned that unobvious mixtures of either demineralized or undemineralized chitin raw materials and urea could provide soil amendment formulations with unique nematicidal and fertilizer properties.

Figure 8:
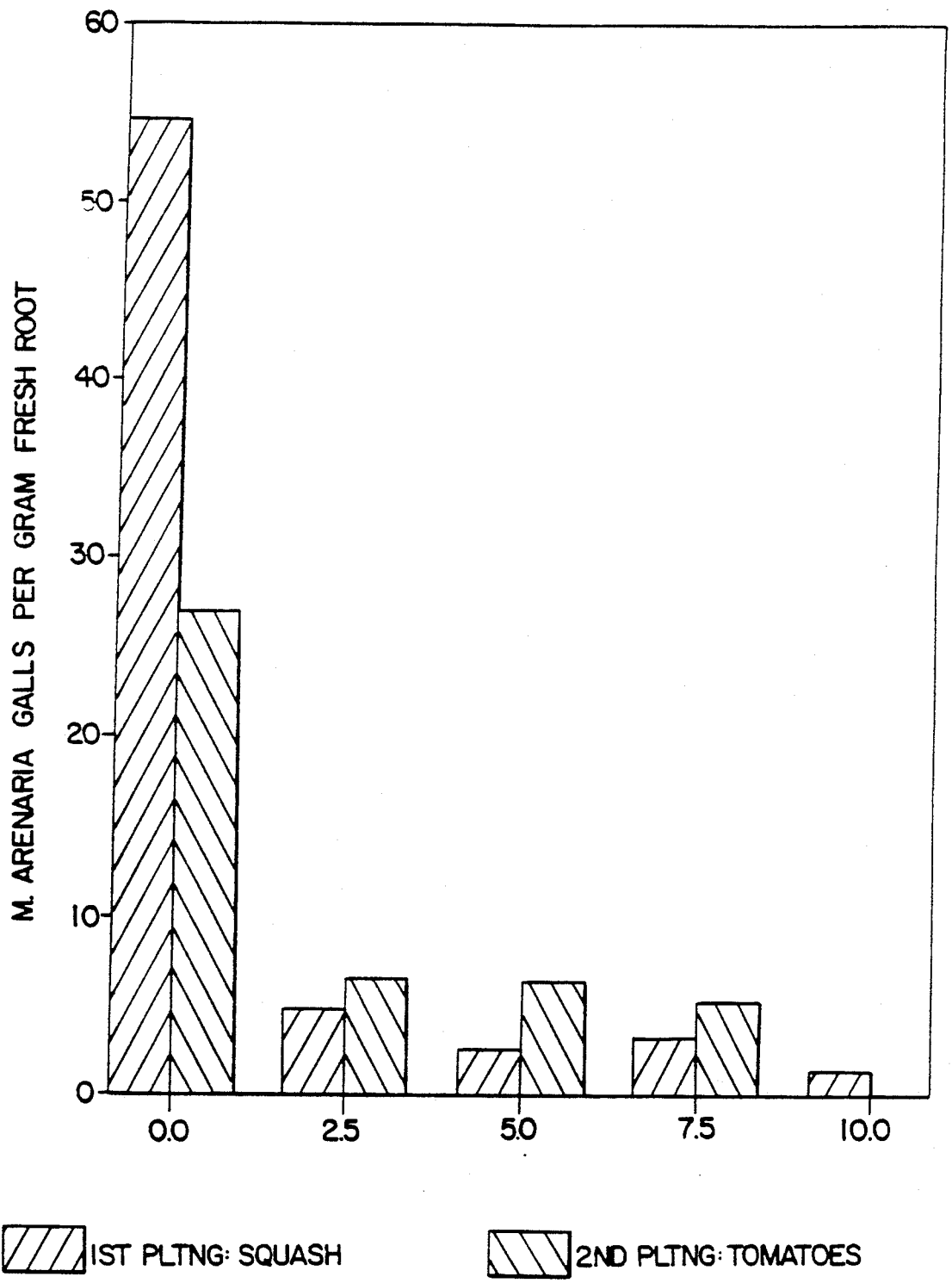
FIG. 8 illustrates the sustained nematicidal effects obtained in squash (first planting) and tomato (second planting) plants following addition of ClandoSan-urea compositions to nematode-infested soils.
Figure 9:
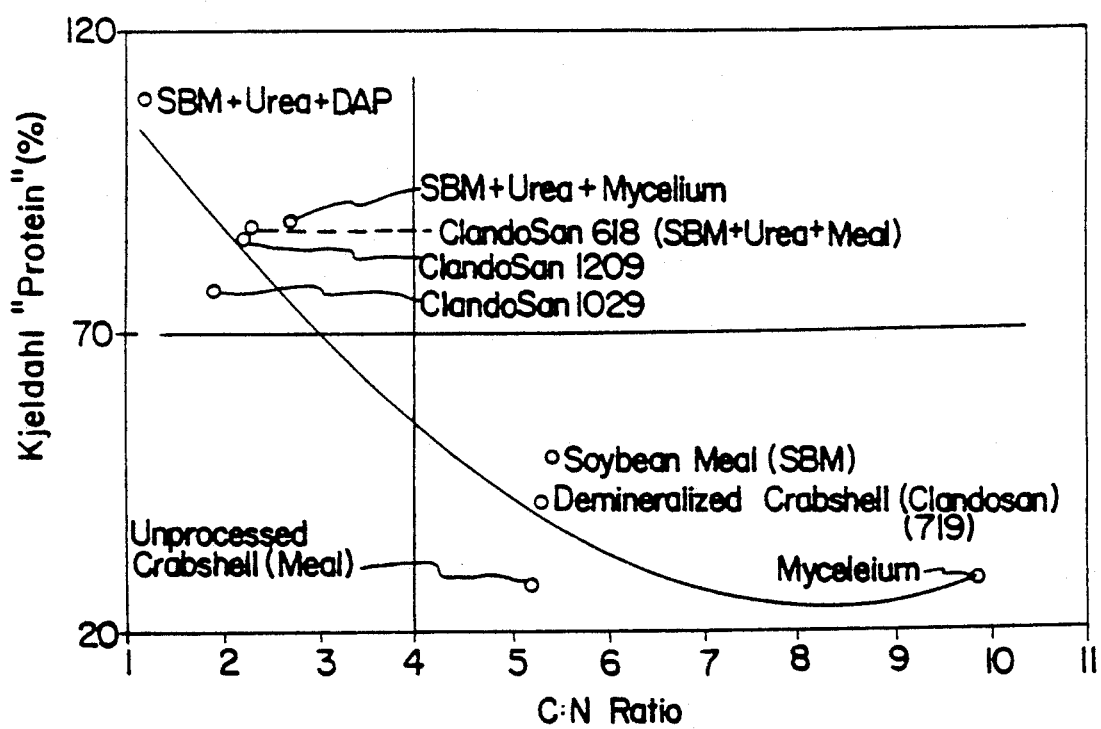
FIG. 9 is a graph plotting C:N ratio against Kjeldahl protein (%), illustrating the combination of low C:N ratio of below 4 with high Kjeldahl protein (%) of at least 70% in the preferred chitin-protein complex, urea, soybean meal formulations described in one embodiment herein.

To test this hypothesis, greenhouse experiments identical to those described in Example 3 were conducted using urea alone and various urea-ClandoSan mixtures as the soil amendments. Representative results obtained in greenhouse studies using mixtures of undemineralized ClandoSan ® 601 and urea as soil amendments with very low C:N ratios (approximately 1.5 to 2.0) and very high Kjeldahl "protein" contents (in excess of 75 grams percent) are illustrated in Table 4 and FIG. 8. Table 4 illustrates the improved nematicidal properties induced in nematode-infested soils by mixing undemineralized chitin raw material with urea at concentrations of at least 0.5 grams urea per kilogram soil.

TABLE 4

NEMATICIDAL EFFECTS OF CHITIN-PROTEIN COMPLEX COMPOSITIONS

Sandy Loam Soil — Set up Day 0
Summer Crookneck Squash — Squash Planted Day 13
Meloidogyne Arenaria (Neal) — Harvested Day 48

| COMPOSITION | CONC. SOIL AMENDMENT (G/KG) CLANDOSAN 601 | UREA | GALL RATE | GALLS PER GM. ROOT | LARVAE PER GM. ROOT | ROOT CONDITION* |
|---|---|---|---|---|---|---|
| Control | 0 | 0 | 3.5 | 54.5 | 157.0 | 3.4 |
| ClandoSan ® 107-1 | 2.5 | 1.00 | 0.6 | 4.8 | 1.3 | 3.0 |
| | 5.0 | 1.00 | 0.6 | 2.7 | 0 | 3.2 |
| | 7.5 | 1.00 | 0.6 | 3.2 | 1.4 | 2.5 |
| | 10.0 | 1.00 | 0.3 | 1.3 | 0 | 2.8 |
| ClandoSan ® 107-2 | 2.5 | 0.75 | 2.7 | 28.6 | 24.7 | 2.4 |
| | 5.0 | 0.75 | 0.9 | 5.0 | 9.3 | 2.1 |
| | 7.5 | 0.75 | 1.3 | 8.5 | 1.4 | 2.0 |
| | 10.0 | 0.75 | 0.7 | 2.4 | 1.6 | 1.9 |
| ClandoSan ® 107-3 | 2.5 | 0.50 | 2.4 | 27.9 | 37.2 | 2.7 |
| | 5.0 | 0.50 | 1.3 | 14.1 | 17.8 | 2.9 |
| | 7.5 | 0.50 | 1.4 | 10.3 | 17.1 | 2.9 |
| | 10.0 | 0.50 | 1.2 | 9.7 | 8.2 | 2.9 |
| ClandoSan ® 107-4 | 2.5 | 0.25 | 3.6 | 38.7 | 126.0 | 3.1 |
| | 5.0 | 0.25 | 3.1 | 36.5 | 108.1 | 3.0 |
| | 7.5 | 0.25 | 2.3 | 20.0 | 67.4 | 2.7 |
| | 10.0 | 0.25 | 1.7 | 10.4 | 33.4 | 2.5 |

*1 = best, 5 = worst root conditions

Related data for ClandoSan ® 719-U (1220) are summarized in Table 5, which illustrates the significant nematicidal properties of compositions consisting of demineralized ClandoSan ® 719 (1220) and urea, as measured by gall rate and galls per gram fresh plant root, and evidence of phytotoxicity of the composition, as measured by plant root weight, at ClandoSan-U concentrations in excess of at times 5 grams or at times 7.5 grams per kilogram soil, depending on urea concentration of the soil amendment.

TABLE 5

NEMATICIDAL EFFECTS OF CHITIN-PROTEIN COMPLEX COMPOSITIONS

Sandy Loam Soil — Set up Day 0
Summer Crookneck Squash — Squash Planted Day 16
Meloidogyne Arenaria (Neal) — Harvested Day 55

| COMPOSITION | CONC. SOIL AMENDMENT (G/KG) CLANDOSAN 719 (1220) | UREA | ROOT WGT. (GM.) | GALL RATE | GALLS PER GM. ROOT | ROOT CONDITION* |
|---|---|---|---|---|---|---|
| Control | 0 | 0 | 0.37 | 3.3 | 40.5 | 4.0 |
| ClandoSan ® 719-U-1 | 2.5 | 1.00 | 0.56 | 0.1 | 0.0 | 3.9 |
| | 5.0 | 1.00 | 0.67 | 0.0 | 0.0 | 3.8 |
| | 7.5 | 1.00 | 0.56 | 0.1 | 0.0 | 3.9 |
| | 10.0 | 1.00 | 0.63 | 0.0 | 0.0 | 3.7 |
| ClandoSan ® 719-U-2 | 2.5 | 0.75 | 0.72 | 0.4 | 1.4 | 3.8 |
| | 5.0 | 0.75 | 0.59 | 0.1 | 0.0 | 3.7 |
| | 7.5 | 0.75 | 0.79 | 0.1 | 0.0 | 3.9 |
| | 10.0 | 0.75 | 0.56 | 0.1 | 0.0 | 3.9 |
| ClandoSan ® 719-U-3 | 2.5 | 0.50 | 0.47 | 0.6 | 4.2 | 3.8 |
| | 5.0 | 0.50 | 0.55 | 0.5 | 1.8 | 3.8 |
| | 7.5 | 0.50 | 0.64 | 1.0 | 0.0 | 3.5 |
| | 10.0 | 0.50 | 0.42 | 0.1 | 0.0 | 4.2 |
| ClandoSan ® 719-U-4 | 2.5 | 0.25 | 0.52 | 2.8 | 17.3 | 3.7 |
| | 5.0 | 0.25 | 0.58 | 1.0 | 5.2 | 3.7 |
| | 7.5 | 0.25 | 0.69 | 0.6 | 2.9 | 3.6 |

TABLE 5-continued

NEMATICIDAL EFFECTS OF CHITIN-PROTEIN COMPLEX COMPOSITIONS
Sandy Loam Soil — Set up Day 0
Summer Crookneck Squash — Squash Planted Day 16
Meloidogyne Arenaria (Neal) — Harvested Day 55

| COMPOSITION | CONC. SOIL AMENDMENT (G/KG) CLANDOSAN 719 (1220) | UREA | ROOT WGT. (GM.) | GALL RATE | GALLS PER GM. ROOT | ROOT CONDITION* |
|---|---|---|---|---|---|---|
| | 10.0 | 0.25 | 0.67 | 0.0 | 0.0 | 3.7 |

*1 = best, 5 = worst root conditions

In all experiments, high soil concentrations of urea (e.g., 0.25–1.0 gram per kilogram soil) when admixed with undemineralized ClandoSan ® 601 or demineralized ClandoSan ® 719 (1220) induced significant adverse effects on soil nematode populations, as measured by very sharp reductions in the number of galls, gall rate, number of galls per gram of fresh root and number of larvae per root system and per gram of fresh root in squash plants grown in the amended soils relative to plants grown in the untreated control soils. Subjective evaluations of root condition suggested that urea supplementation provided protective effects on roots even at high soil concentrations of ClandoSan ® 601.

Similarly, in all experiments supplementation of ClandoSan ® 601 with urea induced a significant increase in plant growth at essentially all concentration levels, as measured by top height, top weight, root weight and total weight of the plants. Factorial analysis of the data indicated that optimal nematicidal and fertilizer effects could be expected at soil concentrations of 2.0 grams ClandoSan ® 601 and 0.7 grams urea per kilogram soil.

Urea, when added to nemetode-infested soils, resulted in significant nematode suppression, as measured by gall rate and galls per gram of fresh root in squash (first planting), a decrease in soil pH and only marginal changes in soil conductivity. In contrast, addition of ClandoSan ® 518 (i.e., ClandoSan ® mixture of 601 and 719 (1220) plus urea). ClandoSan ® 719U-1 (i e., 1.0 g/kg Urea), ClandoSan ® 719U-2 (i.e., 0.75 g/kg Urea), ClandoSan ® 719U-3 (i.e., 0.50 g/kg Urea), and ClandoSan ® 719U-4 (i.e., 0.25 g/kg Urea) was associated with stabilization of pH without evidence of increasing acidification with increasing amendment concentrations, an appreciable and significant increase in soil conductivity, and similarly significant nematode suppression effects.

Table 5's data on root weight demonstrates the plant growth effects achieved by amending soil with ClandoSan-urea compositions.

EXAMPLE 5

Nematicidal and Plant Growth Effects of Mycellium-Urea Compositions

Effects of amending nematode-infested soils were determined as described in Example 3 using mycellium-urea soil amendment concentrations of 2.5 to 11 grams per kilogram soil. Spent chitin-containing fungal mycelia were obtained from a commercial citric acid fermentation process. Mycelia were collected in a trammel (no lime used), vacuum filtered and then air dried at 60° C. for approximately 20 hours. The dried mycelia, representing approximately 10% of the wet citric mycelium, were then milled, sieved and handled in the same manner as all other test materials.

Fertilizer Effects

Tables 6 and 7 show the nematicidal effects of urea and mycelium-urea compositions (Tables 6 and 7 are based on the same data, Table 6 being organized in accordance with concentration of soil amendment compositions while Table 7 is organized according to sources, C:N ratio and Kjeldahl protein). Table 8 shows the plant growth effects of the Table 6 compositions.

The combination of mycelium-urea provides significant reduction in adverse effects caused by the test nematode while enabling in proper ratios the maintenance of good plant growth characteristics.

TABLE 6

NEMATICIDAL EFFECTS OF UREA AND MYCELIUM-UREA COMPOSITIONS
SANDY LOAM SOIL — SET UP DAY 0
SUMMER CROOKNECK SQUASH — SQUASH PLANTED DAY 12
MELOIDOGYNE ARENARIA (NEAL) — HARVESTED DAY 71

| COMPOSITION | CONC. SOIL AMENDMENT (G/KG) | | | AMENDMENT | | | GALLS/GM ROOT | GALL RATE |
| | Mycelium | Urea | Total | % UREA | C:N RATIO | KJELDAHL "PROTEIN" (Gas %) | | |
|---|---|---|---|---|---|---|---|---|
| Control | 0.0 | 0.00 | 0.00 | — | | | 117.0 | 5.0 |
| Urea | 0.0 | 0.25 | 0.25 | 100.0% | 0.4 | 289.7 | 135.2 | 6.5 |
| | 0.0 | 0.50 | 0.50 | 100.0% | 0.4 | 289.7 | 80.7 | 4.5 |
| | 0.0 | 0.75 | 0.75 | 100.0% | 0.4 | 289.7 | 63.7 | 4.0 |
| | 0.0 | 1.00 | 1.00 | 100.0% | 0.4 | 289.7 | 35.0 | 2.0 |
| Mycelium-Urea | 2.5 | 0.00 | 2.50 | 0.0% | 9.9 | 28.2 | 94.4 | 5.3 |
| Formulations: | 2.5 | 0.25 | 2.75 | 9.1% | 5.1 | 52.0 | 95.0 | 5.0 |
| | 2.5 | 0.50 | 3.00 | 16.7% | 3.5 | 71.8 | 49.3 | 4.4 |
| | 2.5 | 0.75 | 3.25 | 23.1% | 2.8 | 88.5 | 13.9 | 1.0 |
| | 2.5 | 1.00 | 3.50 | 28.6% | 2.3 | 102.9 | 3.0 | 0.3 |
| | 5.0 | 0.00 | 5.00 | 0.0% | 9.9 | 28.2 | 93.5 | 5.0 |
| | 5.0 | 0.25 | 5.25 | 4.8% | 6.7 | 40.6 | 36.7 | 1.9 |
| | 5.0 | 0.50 | 5.50 | 9.1% | 5.1 | 52.0 | 3.1 | 0.3 |
| | 5.0 | 0.75 | 5.75 | 13.0% | 4.2 | 62.3 | 16.7 | 0.8 |
| | 5.0 | 1.00 | 6.00 | 16.7% | 3.5 | 71.8 | 0.0 | 0.0 |

TABLE 6-continued

NEMATICIDAL EFFECTS OF UREA AND MYCELIUM-UREA COMPOSITIONS
SANDY LOAM SOIL                          SET UP DAY 0
SUMMER CROOKNECK SQUASH      SQUASH PLANTED DAY 12
MELOIDOGYNE ARENARIA (NEAL)   HARVESTED DAY 71

| | | | | | | | |
|---|---|---|---|---|---|---|---|
| 7.5  | 0.00 | 7.50  | 0.0%  | 9.9 | 28.2 | 106.5 | 6.1 |
| 7.5  | 0.25 | 7.75  | 3.2%  | 7.5 | 36.6 | 3.8   | 0.5 |
| 7.5  | 0.50 | 8.00  | 6.3%  | 6.0 | 44.5 | 4.3   | 0.2 |
| 7.5  | 0.75 | 8.25  | 9.1%  | 5.1 | 52.0 | 1.4   | 0.2 |
| 7.5  | 1.00 | 8.50  | 11.8% | 4.4 | 59.0 | 3.8   | 0.3 |
| 10.0 | 0.00 | 10.00 | 0.0%  | 9.9 | 28.2 | 46.0  | 2.2 |
| 10.0 | 0.25 | 10.25 | 2.4%  | 8.0 | 34.6 | 3.6   | 0.6 |
| 10.0 | 0.50 | 10.50 | 4.8%  | 6.7 | 40.6 | 1.9   | 0.3 |
| 10.0 | 0.75 | 10.75 | 7.0%  | 5.8 | 46.4 | 0.0   | 0.0 |
| 10.0 | 1.00 | 11.00 | 9.1%  | 5.1 | 52.0 | 0.0   | 0.0 |

| COMPOSITION | NEMATODES FROM ROOTS | | | NEMATODES/100 CC. SOIL | | |
|---|---|---|---|---|---|---|
| | Root-Knot Larvae | Lesion | Saprophagous | Root-Knot Larvae | Lesion | Saprophagous |
| Control | 279.2 | 160.9 | 141.1 | 51.6 | 8.2 | 71.8 |
| Urea | 190.8 | 42.1 | 51.9 | 23.6 | 10.4 | 134.3 |
| | 61.4 | 16.0 | 17.6 | 7.4 | 2.0 | 74.9 |
| | 37.8 | 5.9 | 23.5 | 8.4 | 3.5 | 10.4 |
| | 0.0 | 0.6 | 8.1 | 0.0 | 3.3 | 70.6 |
| Mycelium-Urea Formulations: | 239.5 | 32.9 | 30.4 | 75.9 | 6.5 | 108.4 |
| | 61.6 | 15.8 | 29.9 | 33.0 | 5.9 | 131.8 |
| | 11.6 | 1.7 | 38.3 | 0.4 | 0.0 | 140.6 |
| | 2.5 | 12.4 | 29.3 | 0.0 | 0.0 | 61.4 |
| | 0.0 | 0.0 | 5.4 | 0.0 | 0.1 | 120.4 |
| | 163.8 | 45.5 | 51.3 | 88.5 | 4.3 | 111.6 |
| | 14.3 | 11.4 | 24.5 | 0.4 | 0.5 | 219.6 |
| | 0.0 | 5.0 | 25.5 | 0.0 | 0.0 | 334.8 |
| | 0.0 | 6.3 | 15.8 | 0.0 | 0.5 | 235.3 |
| | 0.0 | 0.0 | 6.4 | 0.0 | 0.0 | 227.1 |
| | 125.9 | 30.0 | 38.0 | 27.9 | 2.6 | 65.3 |
| | 0.0 | 0.0 | 19.3 | 0.3 | 0.0 | 226.4 |
| | 0.4 | 0.8 | 14.3 | 0.0 | 0.0 | 632.0 |
| | 0.0 | 0.8 | 5.9 | 1.4 | 0.4 | 364.0 |
| | 0.0 | 0.0 | 2.9 | 0.0 | 0.0 | 118.6 |
| | 7.0 | 2.5 | 49.4 | 21.1 | 3.4 | 175.3 |
| | 0.0 | 0.9 | 38.0 | 0.0 | 0.0 | 302.1 |
| | 0.0 | 2.3 | 22.5 | 0.0 | 0.0 | 639.8 |
| | 0.0 | 0.3 | 6.8 | 0.0 | 0.0 | 394.2 |
| | 0.0 | 0.0 | 5.5 | 0.0 | 0.0 | 836.0 |

TABLE 7

NEMATICIDAL EFFECTS OF UREA AND MYCELIUM-UREA COMPOSITIONS
SANDY LOAM SOIL                          SET UP DAY 0
SUMMER CROOKNECK SQUASH      SQUASH PLANTED DAY 12
MELOIDOGYNE ARENARIA (NEAL)   HARVESTED DAY 71

| COMPOSITION | CONC. SOIL AMENDMENT (G/KG) | | | AMENDMENT | | | GALLS/GM ROOT | GALL RATE |
|---|---|---|---|---|---|---|---|---|
| | Mycelium | Urea | Total | % UREA | C:N RATIO | KJELDAHL "PROTEIN" (Gas %) | | |
| Control | 0.0 | 0.00 | 0.00 | — | — | — | 117.0 | 5.0 |
| Urea | 0.0 | 0.25 | 0.25 | 100.0% | 0.4 | 289.7 | 135.2 | 6.3 |
| | 0.0 | 0.50 | 0.50 | 100.0% | 0.4 | 289.7 | 80.7 | 4.5 |
| | 0.0 | 0.75 | 0.75 | 100.0% | 0.4 | 289.7 | 63.7 | 4.0 |
| | 0.0 | 1.00 | 1.00 | 100.0% | 0.4 | 289.7 | 35.0 | 2.0 |
| Mycelium-Urea Formulations: | 2.5 | 1.00 | 3.50 | 28.6% | 2.3 | 102.9 | 3.0 | 0.3 |
| | 2.5 | 0.75 | 3.25 | 23.1% | 2.8 | 88.5 | 13.9 | 1.0 |
| | 2.5 | 0.50 | 3.00 | 16.7% | 3.5 | 71.8 | 49.3 | 4.4 |
| | 5.0 | 1.00 | 6.00 | 16.7% | 3.5 | 71.8 | 0.0 | 0.0 |
| | 5.0 | 0.75 | 5.75 | 13.0% | 4.2 | 62.3 | 16.7 | 0.8 |
| | 7.5 | 1.00 | 8.50 | 11.8% | 4.4 | 59.0 | 3.8 | 0.3 |
| | 2.5 | 0.25 | 2.75 | 9.1% | 5.1 | 52.0 | 95.0 | 5.0 |
| | 5.0 | 0.50 | 5.50 | 9.1% | 5.1 | 52.0 | 3.1 | 0.3 |
| | 7.5 | 0.75 | 8.25 | 9.1% | 5.1 | 52.0 | 1.4 | 0.2 |
| | 10.0 | 1.00 | 11.00 | 9.1% | 5.1 | 52.0 | 0.0 | 0.0 |
| | 10.0 | 0.75 | 10.75 | 7.0% | 5.8 | 46.4 | 0.0 | 0.0 |
| | 7.5 | 0.50 | 8.00 | 6.3% | 6.0 | 44.5 | 4.3 | 0.2 |
| | 5.0 | 0.25 | 5.25 | 4.8% | 6.7 | 40.6 | 36.7 | 1.9 |
| | 10.0 | 0.50 | 10.50 | 4.8% | 6.7 | 40.6 | 1.9 | 0.3 |
| | 7.5 | 0.25 | 7.75 | 3.2% | 7.5 | 36.6 | 3.8 | 0.5 |
| | 10.0 | 0.25 | 10.25 | 2.4% | 8.0 | 34.6 | 3.6 | 0.6 |
| | 7.5 | 0.00 | 7.50 | 0.0% | 9.9 | 28.2 | 106.5 | 6.1 |
| | 2.5 | 0.00 | 2.50 | 0.0% | 9.9 | 28.2 | 94.4 | 5.3 |
| | 5.0 | 0.00 | 5.00 | 0.0% | 9.9 | 28.2 | 93.5 | 5.0 |

TABLE 7-continued
NEMATICIDAL EFFECTS OF UREA AND MYCELIUM-UREA COMPOSITIONS
SANDY LOAM SOIL                SET UP DAY 0
SUMMER CROOKNECK SQUASH        SQUASH PLANTED DAY 12
MELOIDOGYNE ARENARIA (NEAL)    HARVESTED DAY 71

| | | | | | | |
|---|---|---|---|---|---|---|
| 10.0 | 0.00 | 10.00 | 0.0% | 9.9 | 28.2 | 46.0 | 2.2 |

| | NEMATODES FROM ROOTS | | | NEMATODES/100 CC. SOIL | | |
|---|---|---|---|---|---|---|
| COMPOSITION | Root-Knot Larvae | Lesion | Sapro-phagous | Root-Knot Larvae | Lesion | Sapro-phagous |
| Control | 279.2 | 160.9 | 141.1 | 51.6 | 8.2 | 71.8 |
| Urea | 190.8 | 42.1 | 51.9 | 23.6 | 10.4 | 134.3 |
|  | 61.4 | 16.0 | 17.6 | 7.4 | 2.0 | 74.9 |
|  | 37.8 | 5.9 | 23.5 | 8.4 | 3.5 | 40.4 |
|  | 0.0 | 0.6 | 8.1 | 0.0 | 3.3 | 70.6 |
| Mycelium-Urea | 0.0 | 0.0 | 5.4 | 0.0 | 0.1 | 120.4 |
| Formulations: | 2.5 | 12.4 | 29.3 | 0.0 | 0.0 | 61.4 |
|  | 11.6 | 1.7 | 38.3 | 0.6 | 0.0 | 140.6 |
|  | 0.0 | 0.0 | 6.4 | 0.0 | 0.0 | 227.1 |
|  | 0.0 | 6.3 | 15.8 | 0.0 | 0.5 | 235.3 |
|  | 0.0 | 0.0 | 2.9 | 0.0 | 0.0 | 118.6 |
|  | 61.6 | 15.8 | 29.9 | 33.0 | 5.9 | 131.8 |
|  | 0.0 | 5.0 | 25.5 | 0.0 | 0.0 | 334.8 |
|  | 0.0 | 0.8 | 5.9 | 1.4 | 0.4 | 364.0 |
|  | 0.0 | 0.0 | 5.5 | 0.0 | 0.0 | 836.0 |
|  | 0.0 | 0.3 | 6.8 | 0.0 | 0.0 | 394.2 |
|  | 0.4 | 0.8 | 14.3 | 0.0 | 0.0 | 632.0 |
|  | 14.3 | 11.4 | 24.5 | 0.4 | 0.5 | 219.6 |
|  | 0.0 | 2.3 | 22.5 | 0.0 | 0.0 | 639.8 |
|  | 0.0 | 0.0 | 19.3 | 0.3 | 0.0 | 226.4 |
|  | 0.0 | 0.9 | 38.0 | 0.0 | 0.0 | 302.1 |
|  | 125.9 | 30.0 | 38.0 | 27.9 | 2.6 | 65.3 |
|  | 239.5 | 32.9 | 30.4 | 75.9 | 6.5 | 108.4 |
|  | 163.8 | 45.5 | 51.3 | 88.5 | 4.3 | 111.6 |
|  | 7.0 | 2.5 | 49.4 | 21.1 | 3.4 | 175.3 |

TABLE 8
PLANT GROWTH EFFECTS OF UREA AND MYCELIUM-UREA COMPOSITIONS
SANDY LOAM SOIL                SET UP DAY 0
SUMMER CROOKNECK SQUASH        SQUASH PLANTED DAY 12
MELOIDOGYNE ARENARIA (NEAL)    HARVESTED DAY 71

| COM-POSITION | CONC. SOIL AMENDMENT (G/KG) | | | AMENDMENT | | | GALLS/ GM ROOT | GALL RATE | TOP HGT (CMS) | TOP WGT (GMS) | ROOT WGT (GMS) | PLANT WGT (GMS) |
|---|---|---|---|---|---|---|---|---|---|---|---|---|
| | Mycelium | Urea | Total | % UREA | C:N RATIO | KJELDAHL "PROTEIN" (Gas %) | | | | | | |
| Control | 0.0 | 0.00 | 0.00 | — | — | — | 117.0 | 5.0 | 26.6 | 3.5 | 0.30 | 3.8 |
| Urea | 0.0 | 0.25 | 0.25 | 100.0% | 0.4 | 289.7 | 135.2 | 6.3 | 30.1 | 4.9 | 0.31 | 5.2 |
|  | 0.0 | 0.50 | 0.50 | 100.0% | 0.4 | 289.7 | 80.7 | 4.5 | 28.2 | 3.0 | 0.15 | 3.2 |
|  | 0.0 | 0.75 | 0.75 | 100.0% | 0.4 | 289.7 | 63.7 | 4.0 | 26.5 | 4.1 | 0.19 | 4.3 |
|  | 0.0 | 1.00 | 1.00 | 100.0% | 0.4 | 289.7 | 35.0 | 2.0 | 22.0 | 2.7 | 0.16 | 2.9 |
| Mycelium-Urea | 2.5 | 0.00 | 2.50 | 0.0% | 9.9 | 28.2 | 94.4 | 5.3 | 28.9 | 6.1 | 0.27 | 6.4 |
| Formulations: | 2.5 | 0.25 | 2.75 | 9.1% | 5.1 | 52.0 | 95.0 | 5.0 | 25.3 | 2.8 | 0.18 | 3.0 |
|  | 2.5 | 0.50 | 3.00 | 16.7% | 3.5 | 71.8 | 49.3 | 4.4 | 20.9 | 2.0 | 0.14 | 2.1 |
|  | 2.5 | 0.75 | 3.25 | 23.1% | 2.8 | 88.5 | 13.9 | 1.0 | 23.1 | 3.8 | 0.18 | 4.0 |
|  | 2.5 | 1.00 | 3.50 | 28.6% | 2.3 | 102.9 | 3.0 | 0.3 | 23.6 | 4.5 | 0.23 | 4.7 |
|  | 5.0 | 0.00 | 5.00 | 0.0% | 9.9 | 28.2 | 93.5 | 5.0 | 28.2 | 5.2 | 0.23 | 5.4 |
|  | 5.0 | 0.25 | 5.25 | 4.8% | 6.7 | 40.6 | 36.7 | 1.9 | 14.7 | 1.5 | 0.09 | 1.6 |
|  | 5.0 | 0.50 | 5.50 | 9.1% | 5.1 | 52.0 | 3.1 | 0.3 | 16.8 | 2.6 | 0.16 | 2.8 |
|  | 5.0 | 0.75 | 5.75 | 13.0% | 4.2 | 62.3 | 16.7 | 0.8 | 21.3 | 4.5 | 0.21 | 4.7 |
|  | 5.0 | 1.00 | 6.00 | 16.7% | 3.5 | 71.8 | 0.0 | 0.0 | 21.8 | 4.0 | 0.18 | 4.2 |
|  | 7.5 | 0.00 | 7.50 | 0.0% | 9.9 | 28.2 | 106.5 | 6.1 | 21.5 | 2.9 | 0.17 | 3.1 |
|  | 7.5 | 0.25 | 7.75 | 3.2% | 7.5 | 36.6 | 3.8 | 0.5 | 12.8 | 1.0 | 0.13 | 1.1 |
|  | 7.5 | 0.50 | 8.00 | 6.3% | 6.0 | 44.5 | 4.3 | 0.2 | 20.2 | 4.3 | 0.14 | 4.4 |
|  | 7.5 | 0.75 | 8.25 | 9.1% | 5.1 | 52.0 | 1.4 | 0.2 | 23.1 | 6.2 | 0.21 | 6.4 |
|  | 7.5 | 1.00 | 8.50 | 11.8% | 4.4 | 59.0 | 3.8 | 0.3 | 22.8 | 4.7 | 0.16 | 4.9 |
|  | 10.0 | 0.00 | 10.00 | 0.0% | 9.9 | 28.2 | 46.0 | 2.2 | 23.5 | 3.5 | 0.15 | 3.7 |
|  | 10.0 | 0.25 | 10.25 | 2.4% | 8.0 | 34.6 | 3.6 | 0.6 | 17.0 | 2.5 | 0.14 | 2.6 |
|  | 10.0 | 0.50 | 10.50 | 4.8% | 6.7 | 40.6 | 1.9 | 0.3 | 25.0 | 6.3 | 0.16 | 6.5 |
|  | 10.0 | 0.75 | 10.75 | 7.0% | 5.8 | 46.4 | 0.0 | 0.0 | 21.2 | 4.2 | 0.17 | 4.4 |
|  | 10.0 | 1.00 | 11.00 | 9.1% | 5.1 | 52.0 | 0.0 | 0.0 | 20.9 | 4.3 | 0.08 | 4.4 |

EXAMPLE 6

Fertilizer and Nematicidal Effects of Soybean Meal and Urea Compositions

Effects of amending nematode-infested soils were determined as described in Example 3 using urea soil amendment concentrations of 0.25 to 1.00 gram per kilogram soil (0.025–0.10% w/w) and soybean meal amendments at concentrations of 1.0 to 4.0 grams per kilogram soil (0.1–0.4% w/w).

TABLE 9
EFFECTS OF UREA SOIL AMENDMENTS ON PLANT ROOT SYSTEMS

| | UREA AMENDMENT CONC. (G/KG) | SOIL FEATURES pH | SOIL FEATURES CONDUCTIVITY | ROOT WGT. (GM) | GALL RATE | GALLS/ GRAM FRESH ROOT | NEMATODES FROM ROOTS (NO/GM FRESH ROOT) ROOT-KNOT LARVAE | NEMATODES FROM ROOTS (NO/GM FRESH ROOT) LESION (Pratyienchus) | PER 100 CC SOIL ROOT-KNOT LARVAE | PER 100 CC SOIL LESION |
|---|---|---|---|---|---|---|---|---|---|---|
| | | | | FIRST PLANTING: SQUASH SET UP DAY 0 SQUASH PLANTED DAY 10 SQUASH HARVESTED DAY 56 | | | | | | |
| CONTROL | 0.0 | 6.3 | 35 | 0.44 | 3.5 | 54.5 | 157.0 | 206.6 | 5.2 | 5.0 |
| UREA | 0.25 | 6.5 | 32 | 0.39 | 3.4 | 46.2 | 77.4 | 70.0 | 5.3 | 1.9 |
| | 0.50 | 5.6 | 35 | 0.35 | 3.4 | 54.3 | 212.6 | 41.7 | 1.3 | 0.1 |
| | 0.75 | 6.0 | 33 | 0.39 | 3.0 | 35.9 | 101.3 | 23.8 | 0.0 | 0.0 |
| | 1.00 | 5.9 | 43 | 0.31 | 2.1 | 12.9 | 1.9 | 20.0 | 0.0 | 0.0 |
| | | | | SECOND PLANTING: TOMATOES TOMATOES PLANTED DAY 56 TOMATOES HARVESTED DAY 112 | | | | | | |
| CONTROL | 0.00 | 6.2 | 45 | 1.9 | 4.9 | 27.1 | 40.4 | 99.4 | 7.4 | 2.9 |
| UREA | 0.25 | 6.4 | 69 | 2.1 | 5.8 | 24.2 | 84.1 | 65.2 | 3.8 | 5.8 |
| | 0.50 | 6.2 | 41 | 2.3 | 6.3 | 23.0 | 115.6 | 47.1 | 19.6 | 0.0 |
| | 0.75 | 6.2 | 38 | 2.4 | 3.1 | 13.4 | 84.4 | 16.3 | 8.9 | 1.0 |
| | 1.00 | 6.5 | 33 | 2.6 | 2.4 | 6.7 | 21.9 | 18.1 | 1.1 | 0.0 |

When soybean meal was used alone as a soil amendment significant growth increases relative to control plants occurred at all soybean concentrations used, as measured by top heights, top weights, root weights and, hence, plant weights. (See Table 10). Fertilizer effects of soybean meal generally tended to exceed those of urea in all experiments. Decreased root weights often observed with urea amendments appear only at soil concentrations exceeded 3 grams of soybean meal per kilogram soil (See 0.3% w/w per Table 10). Even at soybean meal concentrations of 0.4% w/w, squash grown in the amended nematode-infested soils were heavier and taller than control plants grown in the unamended, control soils. However, when soybean meal alone was added, tomatoes grown in the amended nematode-infested soils were lighter than control plants grown in the unamended, control soils. (See Table 10).

Addition of 0.5 grams of urea per kilogram soil to the soybean meal amendments resulted in increasing fertilizer or plant nutrition effects for squash up to and including soybean meal concentrations of 3 grams per kilogram soil (0.3% w/w). At 4 grams of soybean meal and 0.5 gram urea per kilogram soil, squash grown in the treated soils remained substantially healthier, as measured by top height, top weight and plant weight, than squash grown in untreated or control nematode-infested soils. (See Table 10). As shown in Table 10, adding 0.5 g/kg of urea to the soybean meal amendments yielded substantially increased fertilizer effects for tomatoes at all soybean meal concentrations.

The squash root phytotoxic effects of urea amendments alone were reversed when soybean meal was added to urea in ratios in excess of two parts of soybean meal per part of urea. Increasing fertilizer or plant nutrition effects occurred at soil concentrations up to nearly 4 grams of soybean meal and 0.5 grams of urea per kilogram soil, as measured by root weights as well as top and plant weights and plant heights. At 4 grams of soybean meal per kilogram soil, however, root weights approximated those of the control plants. Top heights, top weights, and plant weights began to decrease at soil amendment concentrations greater than 4 grams of soybean meal and 0.5 grams of urea per kilogram soil. In the case of tomatoes root weights were substantially greater when soybean meal was added to urea in ratios in excess of two parts of soybean meal per part of urea.

TABLE 10
NEMATODE SUPPRESSION AND FERTILIZER EFFECTS OF SOYBEAN MEAL-UREA COMPOSITIONS

| | Soil Amendment Conc. (G/KG) Soybean Meal | Soil Amendment Conc. (G/KG) Urea | Soil Features pH | Soil Features Conductivity | Gall Rate | Galls/GM Fresh Root Number | Galls/GM Fresh Root % Change | Root Wgt. (GM) | Top Hgt. (CM) | Top Wgt. (GM) | Plant Weight (GM) | Plant Weight (% Change) |
|---|---|---|---|---|---|---|---|---|---|---|---|---|
| | | | | FIRST PLANTING: SQUASH SET UP DAY 0 SQUASH PLANTED DAY 15 SQUASH HARVESTED DAY 53 | | | | | | | | |
| CONTROL | 0.0 | 0.0 | 6.0 | 33 | 3.2 | 42.5 | — | 0.40 | 15.7 | 2.2 | 2.6 | — |
| SOYBEAN MEAL | 1.0 | 0.0 | 5.9 | 31 | 3.9 | 29.0 | −31.8 | 0.69 | 29.9 | 6.1 | 6.8 | +161.5 |
| | 2.0 | 0.0 | 5.7 | 27 | 2.7 | 17.5 | −58.8 | 0.63 | 33.4 | 6.6 | 7.2 | +176.9 |
| | 3.0 | 0.0 | 5.5 | 27 | 2.0 | 25.8 | −39.3 | 0.31 | 24.6 | 3.9 | 4.2 | +61.5 |
| | 4.0 | 0.0 | 5.5 | 33 | 1.2 | 6.4 | −84.9 | 0.47 | 23.3 | 3.9 | 4.4 | +69.2 |
| SOYBEAN MEAL + UREA | 1.0 | 0.5 | 5.8 | 26 | 0.5 | 2.0 | −95.3 | 0.49 | 27.5 | 5.4 | 5.9 | +126.9 |
| | 2.0 | 0.5 | 5.7 | 26 | 0.5 | 1.7 | −96.0 | 0.58 | 28.5 | 5.5 | 6.2 | +134.6 |
| | 3.0 | 0.5 | 5.8 | 27 | 0.5 | 2.8 | −93.4 | 0.72 | 36.3 | 10.1 | 10.8 | +314.4 |
| | 4.0 | 0.5 | 5.9 | 48 | 0.0 | 0.0 | −100.0 | 0.40 | 22.4 | 3.9 | 4.3 | +65.4 |
| | | | | SECOND PLANTING: TOMATOES | | | | | | | | |

TABLE 10-continued
NEMATODE SUPPRESSION AND FERTILIZER EFFECTS OF SOYBEAN MEAL-UREA COMPOSITIONS

| | Soil Amendment Conc. (G/KG) | | | Soil Features | | Galls/GM Fresh Root | | Root | Top | Top | Plant Weight | |
|---|---|---|---|---|---|---|---|---|---|---|---|---|
| | Soybean Meal | Urea | pH | Conductivity | Gall Rate | Number | % Change | Wgt. (GM) | Hgt. (CM) | Wgt. (GM) | (GM) | (% Change) |
| | | | | TOMATOES PLANTED DAY 53 TOMATOES HARVESTED DAY 113 | | | | | | | | |
| CONTROL | 0.0 | 0.0 | 6.1 | 42 | 5.0 | 36.2 | — | 1.3 | NEED DATA | 3.0 | 4.3 | — |
| SOYBEAN MEAL | 1.0 | 0.0 | 6.0 | 41 | 4.9 | 36.7 | −1.4 | 0.9 | | 1.6 | 2.5 | −41.9 |
| | 2.0 | 0.0 | 5.8 | 58 | 5.8 | 35.6 | −1.7 | 0.9 | | 1.5 | 2.4 | −44.2 |
| | 3.0 | 0.0 | 5.7 | 43 | 4.0 | 15.0 | −58.6 | 1.4 | | 2.5 | 3.9 | −9.3 |
| | 4.0 | 0.0 | 5.8 | 37 | 3.0 | 10.0 | −72.4 | 2.4 | | 5.4 | 7.8 | +81.4 |
| SOYBEAN MEAL + UREA | 1.0 | 0.5 | 5.9 | 39 | 2.3 | 8.2 | −77.3 | 1.7 | | 3.5 | 5.2 | +20.9 |
| | 2.0 | 0.5 | 5.8 | 40 | 1.9 | 10.6 | −70.7 | 1.6 | | 2.9 | 4.5 | +4.7 |
| | 3.0 | 0.5 | 6.0 | 31 | 0.0 | 0.0 | −100.0 | 2.9 | | 6.1 | 9.0 | +109.3 |
| | 4.0 | 0.5 | 6.0 | 32 | 0.0 | 0.0 | −100.0 | 3.0 | | 5.5 | 8.5 | +97.7 |

Nematode Suppression Effects

Soybean meal, when added to nematode-infested soils, either alone or in combination with urea, resulted in significant nematode suppression, as measured by gall rate and galls per gram of fresh root. Table 10 illustrates the pronounced nematicidal effect brought about through the combination of soybean meal with urea.

The data of Table 11 is that of separate Experiments 520 and 521.

EXAMPLE 7
Effects of Chitin and Phosphate Additions on the Nematicidal and Fertilizer Properties of Soybean Meal-Urea Compositions Effects of adding various chitin-containing waste materials obtained from shellfish (e.g., crab, crayfish, lobster, prawns and shrimp) processing operations and from fungal mycelia residues of industrial fermentation processes (e.g., production of citric acid, antibiotics and enzymes) to soybean meal-urea compositions were studied in greenhouse experiments by the methods described in Example 3.

TABLE 11
NEMATODE SUPPRESSION EFFECTS OF SOYBEAN MEAL-UREA COMPOSITIONS IN SECOND (TOMATO) PLANTINGS

| | Soil Amendment Conc. (G/KG) | | | Galls/GM Fresh Root | | | NEMATODES FROM ROOTS | | | | | | | NEMATODES PER 100 CC SOIL | | |
|---|---|---|---|---|---|---|---|---|---|---|---|---|---|---|---|---|
| | | | | | | | ROOT-KNOT LARVAE | | LESION (PRATYLENCHUS) | | SAPROPHAGOUS | | | | ROOT-KNOT LARVAE | LESION | SAPROPHAGOUS |
| | Soybean Meal | Urea | Gall Rate | Number | % Change | (NO.) | (No.) | (No./GM Root) | (No.) | (No./GM Root) | (NO.) | (No./GM Root) | | | | | |
| | | | | | EXPERIMENT NO. 520 SET UP DAY 0 SQUASH PLANTED DAY 16 SQUASH HARVESTED DAY 55 TOMATOES PLANTED DAY 55 TOMATOES HARVESTED DAY 128 | | | | | | | | | | | | |
| CONTROL | 0.0 | 0.00 | 5.1 | 13.5 | — | | 99.3 | 38.2 | 89.7 | 34.50 | 22.3 | 8.58 | | | 16.0 | 13.1 | 119.0 |
| UREA | 0.0 | 0.25 | 4.4 | 22.1 | +63.7 | | 38.1 | 27.2 | 77.3 | 55.21 | 21.9 | 15.64 | | | 3.6 | 16.5 | 65.1 |
| | 0.0 | 0.50 | 5.5 | 24.0 | +77.8 | | 96.5 | 96.5 | 86.1 | 86.10 | 56.0 | 56.00 | | | 11.3 | 14.6 | 112.5 |
| | 0.0 | 0.75 | 4.3 | 13.2 | −2.2 | | 64.6 | 34.0 | 49.0 | 25.79 | 23.0 | 12.11 | | | 12.4 | 17.4 | 126.9 |
| | 0.0 | 1.00 | 4.8 | 16.7 | +23.7 | | 61.1 | 40.7 | 130.6 | 87.07 | 58.5 | 39.00 | | | 6.5 | 17.9 | 121.6 |
| | | | | | EXPERIMENT NO. 521 SET UP DAY 0 SQUASH PLANTED DAY 15 SQUASH HARVESTED DAY 53 TOMATOES PLANTED DAY 53 TOMATOES HARVESTED DAY 113 | | | | | | | | | | | | |
| CONTROL | 0.0 | 0.0 | 5.0 | 36.2 | — | | 178.4 | 137.2 | 93.5 | 71.92 | 89.7 | 69.00 | | | 11.8 | 3.4 | 156.1 |
| SOYBEAN MEAL | 1.0 | 0.0 | 4.9 | 36.7 | −1.4 | | 91.9 | 102.1 | 94.9 | 105.44 | 80.0 | 88.89 | | | 18.6 | 9.6 | 90.5 |
| | 2.0 | 0.0 | 5.8 | 35.6 | −1.7 | | 111.8 | 124.2 | 66.4 | 73.78 | 59.5 | 66.11 | | | 27.0 | 4.0 | 91.0 |
| | 3.0 | 0.0 | 4.0 | 15.0 | −58.6 | | 78.5 | 56.1 | 176.3 | 125.93 | 52.5 | 37.50 | | | 10.5 | 15.5 | 54.4 |
| | 4.0 | 0.0 | 3.0 | 10.0 | −72.4 | | 137.9 | 57.5 | 206.4 | 86.00 | 85.1 | 35.46 | | | 20.6 | 9.8 | 38.6 |
| SOYBEAN + UREA | 1.0 | 0.5 | 2.3 | 8.2 | −77.3 | | 55.8 | 32.8 | 99.9 | 58.76 | 164.6 | 96.82 | | | 9.6 | 3.8 | 84.1 |
| | 2.0 | 0.5 | 1.9 | 10.6 | −70.7 | | 135.5 | 94.7 | 113.3 | 70.81 | 76.9 | 48.06 | | | 7.8 | 9.9 | 112.6 |
| | 3.0 | 0.5 | 0.0 | 0.0 | −100.0 | | 0.0 | 0.0 | 96.6 | 33.31 | 103.6 | 35.72 | | | 0.0 | 0.5 | 79.9 |
| | 4.0 | 0.5 | 0.0 | 0.0 | −100.0 | | 2.5 | 0.8 | 79.3 | 26.43 | 24.4 | 8.13 | | | 0.0 | 4.0 | 120.3 |

Crabshell chitin compositions, which are marketed by IGENE Biotechnology, Inc. of Columbia, Md. under the registered trademark ClandoSan®, were prepared from the claws and bodies of blue crabs (*Callinectes sapidus*) after removal of edible crab meat by methods described in McCandliss, Eastwood and Milch (U.S. Pat. No. 4,536,207) and in Rodriguez-Kabana and Milch (U.S. patent Off. Ser. No. 87/084,061, filed Aug. 11, 1987). These methods are set forth in Example 1 and 2 supra. The following formulations were used:

| Composition | Description |
|---|---|
| ClandoSan ® 601 | Demealed crab shell |
| ClandoSan ® 719 (1220) | Demineralized crab shell |
| ClandoSan ® 901 | 75% ClandoSan ® 601 and 25% ClandoSan ® 719 (1220) |

Other chitin-containing materials used in these studies included shells obtained from shrimp, crayfish and horseshoe crabs. All such materials as well as otherwise untreated crab shells (crab "meal" or "crab scrap meal") were water-washed and then dried in a hot-air oven overnight at 100°-110° C. for approximately 16 hours. The dried shell materials were then ground and milled to a particle size such that all of the material passed through a No. 25 U.S.A. Standard Sieve. The materials were, finally, dry blended at room temperature with soybean meal and urea sources in a twin shell (vee cone) blender for approximately 10 minutes to assure adequate homogenization of the mixtures with little or no segregation of particles.

In addition to the above materials, agricultural grade diammonium phosphate and triple superphosphate and spent chitin-containing fungal mycelia obtained from a commercial citric acid fermentation process were also studied to determine their effects as soil amendments. Mycelia were collected in a trammel (no lime used), vacuum filtered and then air dried at 60° C. for approximately 20 hours. The dried mycelia, representing approximately 10% of the wet citric mycelium, were then milled sieved and handled in the same manner as all other test materials.

Representative data are illustrated in Tables 15 through 18. Tables 15 and 17 show the nematode suppression effects of soybean-urea compositions supplemented with various supplements, including chitin (such as crab meal and Fungal Mycelium) and phosphates. Certain ClandoSan® compositions are included. Tables 16 and 18 show plant growth effects of the Table 15 and 17 compositions, respectively. It should be noted that the data in Tables 15 and 16 for soybean-urea compositions are taken from Table 10, supra. Reference may also be made to Table 10's data for the second planting: tomatoes.

TABLE 15

NEMATICIDAL EFFECTS OF CLANDOSAN COMPOSITIONS
SANDY LOAM SOIL — SET UP DAY 0
SUMMER CROOKNECK SQUASH — SQUASH PLANTED DAY 15
MELOIDOGYNE ARENARIA (NEAL) — HARVESTED DAY 53

| COMPOSITION | CONC. SOIL AMENDMENT (G/KG) | | | SOIL CONDITIONS | | GALL RATE | GALLS PER GM. ROOT | ROOT CONDITION |
|---|---|---|---|---|---|---|---|---|
| | CLANDOSAN 901 | UREA | SOYBEAN MEAL | pH | CONDUCT. | | | |
| Control | 0.0 | 0.0 | 0.0 | 6.0 | 33 | 3.2 | 42.5 | 4.0 |
| Urea | 0.0 | 0.5 | 0.0 | 5.4 | 32 | 2.3 | 18.8 | 4.1 |
| Soybean Meal | 0.0 | 0.0 | 1.0 | 5.9 | 31 | 3.9 | 29.0 | 3.7 |
| | 0.0 | 0.0 | 2.0 | 5.7 | 27 | 2.7 | 17.5 | 3.9 |
| | 0.0 | 0.0 | 3.0 | 5.5 | 27 | 2.0 | 25.8 | 4.0 |
| | 0.0 | 0.0 | 4.0 | 5.5 | 33 | 1.0 | 6.4 | 3.8 |
| Urea + Soybean Meal | 0.0 | 0.5 | 1.0 | 5.8 | 26 | 0.5 | 2.0 | 4.3 |
| | 0.0 | 0.5 | 2.0 | 5.7 | 26 | 0.5 | 1.7 | 3.8 |
| | 0.0 | 0.5 | 3.0 | 5.8 | 27 | 0.5 | 2.8 | 3.7 |
| | 0.0 | 0.5 | 4.0 | 5.9 | 48 | 0.0 | 0.0 | 4.0 |
| ClandoSan 901 (75% 601) | 1.0 | 0.0 | 0.0 | 6.2 | 52 | 2.8 | 21.6 | 4.1 |
| ClandoSan 518 | 1.0 | 0.5 | 0.0 | 5.9 | 45 | 0.7 | 3.4 | 4.0 |
| ClandoSan 814 | 1.0 | 0.0 | 1.0 | 6.1 | 46 | 2.6 | 16.1 | 4.2 |
| | 1.0 | 0.0 | 2.0 | 6.0 | 44 | 3.4 | 18.8 | 3.5 |
| | 1.0 | 0.0 | 3.0 | 5.7 | 61 | 3.2 | 22.4 | 3.7 |
| | 1.0 | 0.0 | 4.0 | 5.9 | 45 | 1.6 | 5.8 | 3.3 |
| ClandoSan 1029 | 1.0 | 0.5 | 1.0 | 6.3 | 47 | 0.6 | 2.8 | 4.0 |
| | 1.0 | 0.5 | 2.0 | 6.0 | 48 | 0.2 | 1.3 | 3.7 |
| | 1.0 | 0.5 | 3.0 | 6.0 | 48 | 0.0 | 0.0 | 3.4 |
| | 1.0 | 0.5 | 4.0 | 6.0 | 78 | 0.0 | 0.0 | 3.0 |

TABLE 16

FERTILIZER EFFECTS OF CLANDOSAN COMPOSITIONS
SANDY LOAM SOIL — SET UP DAY 0
SUMMER CROOKNECK SQUASH — SQUASH PLANTED DAY 15
MELOIDOGYNE ARENARIA (NEAL) — HARVESTED DAY 53

| COMPOSITION | CONC. SOIL AMENDMENT (G/KG) | | | TOP HGT. (CM) | TOP HGT. (CM) | ROOT WGT. (GM) | WGT. (GM) | PLANT WEIGHT (% CHANGE) |
|---|---|---|---|---|---|---|---|---|
| | CLANDOSAN 901 | UREA | SOYBEAN MEAL | | | | | |
| Control | 0.0 | 0.0 | 0.0 | 15.7 | 2.2 | 0.40 | 2.6 | — |
| Urea | 0.0 | 0.5 | 0.0 | 18.7 | 2.5 | 0.32 | 2.8 | +8 |
| Soybean Meal | 0.0 | 0.0 | 1.0 | 29.9 | 6.1 | 0.69 | 6.8 | +162 |
| | 0.0 | 0.0 | 2.0 | 33.4 | 6.6 | 0.63 | 7.2 | +177 |
| | 0.0 | 0.0 | 3.0 | 24.6 | 3.9 | 0.31 | 4.2 | +62 |

TABLE 16-continued

FERTILIZER EFFECTS OF CLANDOSAN COMPOSITIONS
SANDY LOAM SOIL — SET UP DAY 0
SUMMER CROOKNECK SQUASH — SQUASH PLANTED DAY 15
MELOIDOGYNE ARENARIA (NEAL) — HARVESTED DAY 53

| COMPOSITION | CLANDOSAN 901 | UREA | SOYBEAN MEAL | HGT. (CM) | TOP HGT. (CM) | TOP WGT. (GM) | ROOT WGT. (GM) | PLANT WEIGHT (% CHANGE) |
|---|---|---|---|---|---|---|---|---|
| | 0.0 | 0.0 | 4.0 | 23.3 | 3.9 | 0.47 | 4.4 | +69 |
| Urea + Soybean Meal | 0.0 | 0.5 | 1.0 | 27.5 | 5.4 | 0.49 | 5.9 | +127 |
| | 0.0 | 0.5 | 2.0 | 28.5 | 5.5 | 0.58 | 6.1 | +135 |
| | 0.0 | 0.5 | 3.0 | 36.3 | 10.1 | 0.72 | 10.8 | +315 |
| | 0.0 | 0.5 | 4.0 | 22.4 | 3.9 | 0.40 | 4.3 | +65 |
| ClandoSan 901 (75% 601) | 1.0 | 0.0 | 0.0 | 25.3 | 5.0 | 0.51 | 5.5 | +112 |
| ClandoSan 518 | 1.0 | 0.5 | 0.0 | 28.9 | 6.3 | 0.59 | 6.9 | +165 |
| ClandoSan 814 | 1.0 | 0.0 | 1.0 | 33.8 | 8.3 | 0.62 | 8.9 | +242 |
| | 1.0 | 0.0 | 2.0 | 40.6 | 11.2 | 0.85 | 12.1 | +365 |
| | 1.0 | 0.0 | 3.0 | 44.1 | 12.7 | 0.67 | 13.4 | +415 |
| | 1.0 | 0.0 | 4.0 | 39.5 | 12.9 | 1.04 | 13.9 | +435 |
| ClandoSan 1029 | 1.0 | 0.5 | 1.0 | 37.6 | 11.1 | 0.71 | 11.8 | +354 |
| | 1.0 | 0.5 | 2.0 | 38.4 | 12.3 | 0.76 | 13.1 | +404 |
| | 1.0 | 0.5 | 3.0 | 37.4 | 11.0 | 0.66 | 11.7 | +350 |
| | 1.0 | 0.5 | 4.0 | 35.7 | 12.8 | 1.25 | 14.1 | +442 |

TABLE 17

NEMATICIDAL EFFECTS OF SUPPLEMENTING SOYBEAN - UREA COMPOSITIONS
SANDY LOAM SOIL — SET UP DAY 0
SUMMER CROOKNECK SQUASH — SQUASH PLANTED DAY 18
MELOIDOGYNE ARENARIA (NEAL) — HARVESTED DAY 60

| COMPOSITION | Soybean Meal | Urea | "Chitin" | DAP | Superphosphate | Total | "CHITIN" SOURCE | % UREA | C:N RATIO | KJELDAHL "PROTEIN" (Gas %) |
|---|---|---|---|---|---|---|---|---|---|---|
| Control | 0.0 | 0.0 | 0.0 | 0.0 | 0.0 | 0.0 | — | — | — | — |
| Temik 15G (60 mgm) | 0.0 | 0.0 | 0.0 | 0.0 | 0.0 | 0.0 | — | — | — | — |
| Soybean Meal-Urea Compositions: | 1.0 | 0.5 | 1.0 | 0.0 | 0.0 | 2.5 | Blue Crab | 20.0% | 2.2 | 87.2 |
| | 1.0 | 0.5 | 1.0 | 0.0 | 0.0 | 2.5 | Horseshoe Crab | 20.0% | 1.8 | 96.1 |
| | 1.0 | 0.5 | 1.0 | 0.0 | 0.0 | 2.5 | Fungal Mycelium | 20.0% | 2.8 | 86.9 |
| | 1.0 | 0.5 | 0.0 | 1.0 | 0.0 | 2.5 | — | 20.0% | 1.2 | 107.0 |
| | 1.0 | 0.5 | 0.0 | 0.5 | 0.5 | 2.5 | — | 20.0% | 1.5 | 94.5 |

| COMPOSITION | GALLS/GM ROOT | GALL RATE | NEMATODES FROM ROOTS Root-Knot Larvae | NEMATODES FROM ROOTS Saprophagous | NEMATODES PER 100 CC. SOIL Root-Knot Larvae | NEMATODES PER 100 CC. SOIL Saprophagous |
|---|---|---|---|---|---|---|
| Control | 24.8 | 1.8 | 73.4 | 13.1 | 13.9 | 129.4 |
| Temik 15G (60 mgm) | 1.8 | 0.2 | 0.3 | 3.4 | 0.0 | 17.9 |
| Soybean Meal-Urea Compositions: | 9.6 | 1.1 | 13.6 | 12.3 | 5.3 | 149.0 |
| | 5.3 | 0.6 | 2.9 | 9.3 | 2.6 | 96.8 |
| | 2.6 | 0.4 | 0.0 | 7.6 | 0.0 | 186.8 |
| | 0.0 | 0.0 | 0.0 | 5.1 | 0.0 | 74.0 |
| | 0.0 | 0.0 | 0.0 | 3.9 | 0.0 | 70.6 |

TABLE 18

PLANT GROWTH EFFECTS OF SUPPLEMENTING SOYBEAN - UREA COMPOSITIONS
SANDY LOAM SOIL — SET UP DAY 0
SUMMER CROOKNECK SQUASH — SQUASH PLANTED DAY 18
MELOIDOGYNE ARENARIA (NEAL) — HARVESTED DAY 60

| COMPOSITION | Soybean Meal | Urea | "Chitin" | DAP | Superphosphate | Total | "CHITIN" SOURCE | % UREA | C:N RATIO | KJELDAHL "PROTEIN" (Gas) | TOP HGT (CMS) | TOP WGT (GMS) | ROOT WGT (GMS) | ROOT WGT (GMS) |
|---|---|---|---|---|---|---|---|---|---|---|---|---|---|---|
| Control | 0.0 | 0.0 | 0.0 | 0.0 | 0.0 | 0.0 | — | — | — | — | 27.2 | 5.3 | 0.21 | 5.5 |
| Temik 15G (60 mgm) | 0.0 | 0.0 | 0.0 | 0.0 | 0.0 | 0.0 | — | — | — | — | 26.1 | 4.9 | 0.17 | 5.1 |
| Soybean Meal- | 1.0 | 0.5 | 1.0 | 0.0 | 0.0 | 2.5 | Blue Crab | 20.0% | 2.2 | 87.2 | 30.4 | 10.7 | 0.27 | 11.0 |

TABLE 18-continued

PLANT GROWTH EFFECTS OF SUPPLEMENTING SOYBEAN - UREA COMPOSITIONS
SANDY LOAM SOIL — SET UP DAY 0
SUMMER CROOKNECK SQUASH — SQUASH PLANTED DAY 18
MELOIDOGYNE ARENARIA (NEAL) — HARVESTED DAY 60

| COM-POSITION | CONCENTRATION SOIL AMENDMENT (G/KG) | | | | | | AMENDMENT | | | | | | | |
|---|---|---|---|---|---|---|---|---|---|---|---|---|---|---|
| | Soybean Meal | Urea | "Chitin" | DAP | Superphosphate | Total | "CHITIN" SOURCE | % UREA | C:N RATIO | KJELDAHL "PROTEIN" (Gas) | TOP HGT (CMS) | TOP WGT (GMS) | ROOT WGT (GMS) | ROOT WGT (GMS) |
| Urea Compositions: | 1.0 | 0.5 | 1.0 | 0.0 | 0.0 | 2.5 | Horseshoe Crab | 20.0% | 1.8 | 96.1 | 31.0 | 8.8 | 0.19 | 9.0 |
| | 1.0 | 0.5 | 1.0 | 0.0 | 0.0 | 2.5 | Fungal Mycelium | 20.0% | 2.8 | 86.9 | 28.9 | 5.9 | 0.19 | 6.1 |
| | 1.0 | 0.5 | 0.0 | 1.0 | 0.0 | 2.5 | — | 20.0% | 1.2 | 107.0 | 28.3 | 4.9 | 0.15 | 5.1 |
| | 1.0 | 0.5 | 0.0 | 0.5 | 0.5 | 2.5 | — | 20.0% | 1.5 | 94.5 | 29.2 | 7.0 | 0.20 | 7.2 |

Tables 15, and 17 all show the improved effects of nematode suppression properties realized by combining chitin with soybean meal-urea compositions.

Table 15 shows ClandoSan® 1029 (soybean meal-+urea+chitin) effecting improved nematode suppression (as compared with soybean meal and urea alone) at all concentrations except 1.0 g/kg of soybean meal.

Table 17 shows nematode suppression at all concentrations of all chitin-supplemented soybean-urea compositions. Suppression was also achieved when phosphates were added in lieu of chitin.

Tables 16 and 18 illustrate the improved plant nutrition (fertilizer) effects realized upon the treating soil with the same nematode-suppressing compositions displayed in Tables 15 and 17.

ClandoSan-urea compositions (ClandoSan® 518), ClandoSan-soybean meal compositions (ClandoSan® 814), and ClandoSan-urea-soybean meal compositions (ClandoSan® 1029) did not demonstrate any evidence of phytotoxicity with increasing soil concentrations.

Phytotoxic effects did, however, began to appear at soil concentrations of 0.3% (w/w) with soybean meal alone and at 0.4% with the soybean-urea mixtures, from Table 16.

Only marginal increases in fertilizer effects were observed in soils amended with ClandoSan-soybean compositions at amendment concentrations in excess of 0.1% ClandoSan® and 0.1% soybean meal, either with or without the addition of urea. Optimal fertilizer and nematode suppression effects were realized with a formulation consisting of 0.1% ClandoSan® 601 (or ClandoSan® 901), 0.1% to 0.2% soybean meal, and 0.05% urea.

EXAMPLE 8

Experiments similar to those described herein were carried out in accordance with the information set forth in the following Tables 19, 20, 21 and 22 employing ClandoSan® 618 and Temik. The beneficial effects of ClandoSan® 618 alone and in combination with Temik® are shown.

TABLE 19

DOSE:RESPONSE EFFECTS OF CLANDOSAN® 618
One Kilogram of 50:50 Sand:Soil Mixture Per Pot in Greenhouse Experiments; Elberta Soil (Kaiser);
Five seeds "Davis" Soybean (Glycine max - pea legume family) Per Pot; Set Up Day 0 (March 1988),
Soybeans Planted Day 9 and Harvested Day 44. Average of Eight Pots. Random Block Design.

| ClandoSan® 618 Soil Concentration (Gm/Kgm Soil) | Top Height (Cm) | Top Weight (Gm) | Galls/Gram Fresh Root | Root-knot Larvae* | Non-Parasitic Nematodes* | Chitinase Activity** |
|---|---|---|---|---|---|---|
| 0 (Control) | 25.7 | 2.1 | 24.5 | 1,287.0 | 32.0 | 6.12 |
| 1.0 | 29.2 | 2.6 | 19.1 | 1,046.9 | 49.3 | 9.03 |
| 2.0 | 29.6 | 2.9 | 18.2 | 954.6 | 105.3 | 8.57 |
| 3.0 | 39.2 | 5.9 | 5.2 | 308.5 | 196.9 | 10.24 |
| 4.0 | 39.0 | 6.7 | 0.4 | 0.6 | 269.1 | 9.28 |
| 5.0 | 38.0 | 6.8 | 0 | 0 | 214.6 | 8.68 |
| 6.0 | 28.5 | 4.6 | 0 | 0 | 204.5 | 8.14 |

*Per 100 cc. soil
**ug p-nitrophenol released/hour/gram of dry soil (Nematropica 123: 71–84, 1982; Plant and Soil 75: 95–106, 1983)

TABLE 20

COMPARATIVE EFFECTS OF CLANDOSAN® 618 AND ALDICARB (TEMIK® 15 G)
Seven Kgm Sand:Soil Mixture in One Square Foot Microplots; Elberta Soil (Kaiser);
One Seedling "Black Beauty" Eggplant (Solanum melongena - nightshade family)
Per Microplot; Set Up Day 0 (June, 1987), Eggplants Planted Day 19 and Final Harvest on
Day 113 (11 Total Harvests); Average of Eight Microplots,
Random Block Design, Auburn, Alabama.

| Treatment | Total No. Fruit | Total Yield (Lbs./Plot) | Fresh Shoot Wgt. (Lbs.) | Root-Knot Larvae* | Non-Parasitic Nematodes** | Soil pH |
|---|---|---|---|---|---|---|
| Control | 8.5 | 5.4 | 2.6 | 232 | 95 | 6.3 |
| Control + Temik® (0.83 g/plot) | 14.1 | 8.5 | 3.9 | 270 | 71 | 6.3 |
| ClandoSan® (4 g/kgm soil) | 15.6 | 8.8 | 3.6 | 176 | 105 | 6.3 |
| ClandoSan® + | 19.0 | 11.6 | 4.9 | 162 | 83 | 6.4 |

TABLE 20-continued

COMPARATIVE EFFECTS OF CLANDOSAN ® 618 AND ALDICARB (TEMIK ® 15 G)
Seven Kgm Sand:Soil Mixture in One Square Foot Microplots; Elberta Soil (Kaiser);
One Seedling "Black Beauty" Eggplant (*Solanum melongena* - nightshade family)
Per Microplot; Set Up Day 0 (June, 1987), Eggplants Planted Day 19 and Final Harvest on
Day 113 (11 Total Harvests); Average of Eight Microplots,
Random Block Design, Auburn, Alabama.

| Treatment | Total No. Fruit | Total Yield (Lbs./Plot) | Fresh Shoot Wgt. (Lbs.) | Root-Knot Larvae* | Non-Parasitic Nematodes** | Soil pH |
|---|---|---|---|---|---|---|
| Temik ® (as above) | | | | | | |

*M. incognita* juveniles per 100 cc. soil
**Saprophagous nematodes per 100 cc. soil

TABLE 21

COMPARATIVE EFFECTS OF CLANDOSAN ® 618 AND ALDICARB (TEMIK ® 15 G)
Seven Kgm Sand:Soil Mixture in One Square Foot Microplots; Elberta Soil (Kaiser);
Five Seeds "Pink Eye" Purple Hull Cowpeas (*Vigna unguiculata* - pea legume family)
Per Microplot; Set Up Day 0 (June 1987), Peas Planted Day 12 and Final Harvest on Day 107
(6 Total Harvests); Average of Eight Microplots, Random Block Design, Auburn, Alabama.

| Treatment | Total Yield (Gms/Plot) | Total No. Pods | Plant Wgt. (Lbs.) | Root-Knot Larvae* | Non-Parasitic Nematodes* | Soil pH |
|---|---|---|---|---|---|---|
| Control | 987.9 | 193.1 | 4.0 | 33.3 | 134.0 | 6.4 |
| Control + Temik ® (0.83 g/plot) | 1,016.9 | 196.0 | 5.8 | 16.1 | 131.8 | 6.5 |
| ClandoSan ® (4 g/kgm soil) | 1,156.5 | 208.6 | 3.9 | 3.4 | 203.4 | 6.6 |
| ClandoSan ® + Temik ® (as above) | 1,118.9 | 189.9 | 4.3 | 0.3 | 232.0 | 6.6 |

*Per 100 cc. soil

TABLE 22

COMPARATIVE EFFECTS OF CLANDOSAN ® 618 AND ALDICARB (TEMIK ® 15 G)
Seven Kgm. Sand:Soil Mixture in One Square Foot Microplots; Elberta Soil (Gottler);
One Seedling "Culbro 1" Tobacco (*Nicotiana tabacum* - nightshade family) Per Microplot;
Set Up Day 0 (August 1987), Tobacco Planted Day 9 and Harvested Day 60;
Average of Eight Microplots, Random Block Design, Auburn, Alabama.

| Treatment | Leaf Wgt. (Gm.) | Stem Wgt. (Gm.) | Root-Knot Larvae* | Cyst Larvae* | Non-Parasitic Nematodes* | Soil pH |
|---|---|---|---|---|---|---|
| Control | 188.0 | 166.7 | 523.9 | 5.4 | 64.9 | 6.5 |
| Control + Temik ® (0.83 g/plot) | 299.9 | 272.5 | 365.4 | 10.1 | 150.0 | 6.5 |
| ClandoSan ® (4 g/kgm soil) | 366.5 | 403.0 | 226.4 | 0.9 | 127.8 | 6.5 |
| ClandoSan ® + Temik ® (as above) | 347.4 | 402.9 | 72.3 | 0.6 | 178.5 | 6.5 |

*Per 100 cc. soil

INDUSTRIAL APPLICABILITY

As can be seen from the preceding disclosure, the present invention is industrially useful in providing on the one hand chitin-containing biological waste materials in a range of soil amendment products and on the other hand providing soybean meal urea based soil amendment compositions, all of which are characterized as having nematistatic and nematicidal as well as plant nutritional properties which are useful in horticultural and agricultural applications.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

We claim:

1. A soil amendment composition capable of stimulating the reproduction and development of normal soil microflora which produce ammonia and enzymes that are antagonistic to plant pathogenic nematodes of selected crop plants, which comprises:
   (a) at least one of (a) (1) soybean meal and (a)(2) chitin-protein complex obtained from crustacean shells or fungal mycelia, and
   (b) urea said component (b) being present in an amount effective to provide ammoniacal nitrogen sufficient for suppressing the growth of said pathogenic nematodes and said component (a) being present in an amount effective for suppressing the growth of said pathogenic nematodes in combination with component (b) while alleviating phytotoxic effects of component (b), whereby the amounts of (a) and (b) in said composition being adapted to provide about 1 to 3 grams of said composition per kilogram of soil in which said composition is admixed, wherein the ratio of (a)(1) meal to (b) is 2:1 to 8:1, or the ratio of (a)(2) complex to (b) is 5:1 to 1.5:1, or the ratio of (a)(1) meal:(b):(a)(2) complex is 3.0 to 5.0 parts (a)(1) meal:1:0 part:(b):1.5 to 3.5 parts (a)(2) complex.

2. A composition according to claim 1, wherein at least two parts by weight of soybean meal are present for each part of urea.

3. A composition according to claim 1 in the form of granules, pellets or prills.

4. A composition according to claim 1, wherein the ratio of carbon atoms to nitrogen atoms is five (5) to one (1) or less.

5. A composition according to claim 1, wherein 5% to 50% of the weight of the composition is urea.

6. A composition according to claim 1 having a high Kjeldahl protein content.

7. A composition of matter comprising a plant growth medium in admixture with a nematicidally effective amount of the composition according to claim 1.

8. A composition according to claim 7, wherein the plant growth medium is soil containing both inorganic clay minerals and organic humus substances and the admixture extends to the root system of a selected crop growing therein.

9. A composition according to claim 8, wherein the plant growth medium is a potting soil.

10. A method for suppressing the growth of plant-pathogenic nematodes in a plant growth medium capable of supporting said growth which comprises admixing at least a nematistatically effective and non-phytotoxic amount of a composition according to claim 1 with said plant growth medium to suppress the growth of said nematodes.

11. A method according to claim 10, wherein the admixing is done at least one week prior to seeding or planting in said plant growth medium.

12. A method according to claim 10, wherein the crop plant is a deciduous fruit or nut crop.

13. A method according to claim 10, wherein the plant-pathogenic nematode is endoparasitic and selected from the group consisting of root-knot nematodes of the Meloidogyne genus, root-lesion nematodes of the Pratylenchus genus, cyst-forming nematodes of the Heterodera or Globodera genus, citrus nematodes of the Tylenchulus genus, reniform nematodes of the Rotylenchulus genus, and burrowing nematodes of the Radopholus genus.

14. A method according to claim 10, wherein the plant-pathogenic nematode is ectoparasitic and selected from the group consisting of dagger nematodes of the Xiphinema genus, stubby-root nematodes of the Trichodorus genus, spiral nematodes of the Rotylenchus or Helicotylenchus genus, sting nematodes of the Belonolaimus genus, and pin nematodes of the Paratylenchus genus.

15. A method according to claim 10, wherein the plant-pathogenic nematode is selected from the group consisting of leaf nematodes of the Aphelenchoides genus and bulb and stem nematodes of the Ditylenchus genus.

16. A method according to claim 10, wherein said composition is in the form of granules, pellets or prills.

17. A method for suppressing the growth of plant-pathogenic nematodes in a plant growth medium capable of supporting said growth, which comprises applying the composition of claim 1 to said medium at a rate of between 1.5 to 4.5 grams of composition per kilogram of medium.

18. A composition according to claim 1, wherein the source of chitin-protein complex is dried crustacean shell wastes of seafood processing operations or fungal mycelial residues remaining after industrial fermentations.

* * * * *